(12) United States Patent
Cho

(10) Patent No.: US 7,543,114 B2
(45) Date of Patent: Jun. 2, 2009

(54) SYSTEM AND CONTROLLER WITH REDUCED BUS UTILIZATION TIME

(75) Inventor: Sang-yeun Cho, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 304 days.

(21) Appl. No.: 11/044,038

(22) Filed: Jan. 28, 2005

(65) Prior Publication Data

US 2005/0188121 A1  Aug. 25, 2005

(30) Foreign Application Priority Data

Feb. 19, 2004  (KR) ...................... 10-2004-0011014

(51) Int. Cl.
*G06F 13/00* (2006.01)
*G06F 13/28* (2006.01)
*G06F 12/00* (2006.01)

(52) U.S. Cl. .............. 711/137; 365/189.02; 365/189.07

(58) Field of Classification Search .................. 711/137
See application file for complete search history.

(56) References Cited

U.S. PATENT DOCUMENTS

| | | | | |
|---|---|---|---|---|
| 4,410,941 A | * | 10/1983 | Barrow et al. ................ | 711/207 |
| 4,486,834 A | * | 12/1984 | Kobayashi et al. .......... | 711/148 |
| 5,170,476 A | * | 12/1992 | Laakso et al. ................ | 711/140 |
| 5,410,674 A | * | 4/1995 | Lawler ........................ | 710/66 |
| 5,630,045 A | * | 5/1997 | Krygowski et al. ........... | 714/10 |
| 5,778,436 A | * | 7/1998 | Kedem et al. ................ | 711/137 |
| 5,896,549 A | | 4/1999 | Hansen et al. ............... | 395/842 |
| 6,112,303 A | * | 8/2000 | Stancil ......................... | 713/2 |
| 6,125,410 A | | 9/2000 | Salbaum et al. ............... | 710/22 |

(Continued)

FOREIGN PATENT DOCUMENTS

| | | | | |
|---|---|---|---|---|
| JP | | 08126412 A | * | 5/1996 |
| JP | | 08328914 A | * | 12/1996 |
| JP | | 2003030046 A | * | 1/2003 |

OTHER PUBLICATIONS

Howstuffworks; "The Serial Connection"; http://web.archive.org/web/20030605040923/http://computer.howstuffworks.com/serial-port2.htm; p. 2.*

(Continued)

*Primary Examiner*—Matt Kim
*Assistant Examiner*—Christopher D Birkhimer
(74) *Attorney, Agent, or Firm*—Harness, Dickey & Pierce, P.L.C.

(57) ABSTRACT

A memory controller may reduce bus utilization time. The memory controller may include a main controller, a data reading unit, and a serial interface. The main controller may store a control data signal received from a processor through a bus, and may control a memory by generating a request data signal, which may be based on the stored control data signal. The data reading unit may store read address signals, which may be received from at least one of the processor and IP blocks through another bus, and may read data from the memory by generating a command data signal, which may be based on the stored read address signal. The serial interface may interface at least one of the main controller and the data reading unit with the memory. The memory controller may reduce the utilization time of a bus by more efficiently controlling data reading and/or writing operations of the memory.

13 Claims, 13 Drawing Sheets

U.S. PATENT DOCUMENTS

| | | | | |
|---|---|---|---|---|
| 6,134,633 | A * | 10/2000 | Jacobs | 711/137 |
| 6,195,735 | B1 * | 2/2001 | Krueger et al. | 711/204 |
| 6,219,760 | B1 * | 4/2001 | McMinn | 711/137 |
| 6,260,116 | B1 * | 7/2001 | Davis et al. | 711/137 |
| 6,314,480 | B1 * | 11/2001 | Nemazie et al. | 710/74 |
| 6,334,173 | B1 * | 12/2001 | Won et al. | 711/156 |
| 6,341,335 | B1 * | 1/2002 | Kanai et al. | 711/137 |
| 6,393,527 | B1 * | 5/2002 | Rao et al. | 711/137 |
| 6,412,045 | B1 * | 6/2002 | DeKoning et al. | 711/135 |
| 6,430,653 | B1 * | 8/2002 | Fujikawa | 711/113 |
| 6,438,670 | B1 * | 8/2002 | McClannahan | 711/167 |
| 6,453,434 | B2 * | 9/2002 | Delp et al. | 714/718 |
| 6,463,491 | B1 * | 10/2002 | Furuta et al. | 710/240 |
| 6,490,658 | B1 * | 12/2002 | Ahmed et al. | 711/140 |
| 6,496,906 | B1 * | 12/2002 | Novak et al. | 711/154 |
| 6,516,400 | B1 * | 2/2003 | Suzuki | 711/209 |
| 6,560,680 | B2 * | 5/2003 | Meyer | 711/138 |
| 6,594,730 | B1 * | 7/2003 | Hum et al. | 711/137 |
| 6,629,164 | B1 | 9/2003 | Rustad et al. | 710/34 |
| 6,650,593 | B2 * | 11/2003 | Takemae | 365/233 |
| 2001/0016894 | A1 * | 8/2001 | Pham | 711/104 |
| 2002/0042863 | A1 * | 4/2002 | Jeddeloh | 711/143 |
| 2002/0056027 | A1 * | 5/2002 | Kanai et al. | 711/137 |
| 2002/0095532 | A1 * | 7/2002 | Surugucchi et al. | 710/5 |
| 2002/0145919 | A1 * | 10/2002 | Lamb et al. | 365/189.09 |
| 2002/0147892 | A1 * | 10/2002 | Rentschler et al. | 711/154 |
| 2002/0172079 | A1 * | 11/2002 | Hargis et al. | 365/193 |
| 2003/0009655 | A1 * | 1/2003 | Blaner et al. | 713/1 |
| 2003/0018837 | A1 * | 1/2003 | Hussain et al. | 710/22 |
| 2003/0018857 | A1 * | 1/2003 | Anderson et al. | 711/137 |
| 2003/0110350 | A1 * | 6/2003 | McGee et al. | 711/108 |
| 2003/0154349 | A1 * | 8/2003 | Berg et al. | 711/137 |
| 2003/0229762 | A1 * | 12/2003 | Maiyuran et al. | 711/137 |
| 2004/0006671 | A1 * | 1/2004 | Handgen et al. | 711/137 |
| 2004/0225827 | A1 * | 11/2004 | Yokota et al. | 711/103 |

OTHER PUBLICATIONS

"Computer Hardware: Information about the serial port / com port"; http://web.archive.org/web/20000302200831/http://www.computerhope.com/help/serial.htm; pp. 3-4.*

Ryna Bender; "Memory as Vectors", The MIT Press, Apr. 17, 2000; pp. 1-4; http://mitpress.mit.edu/sicp/full-text/sicp/book/node118.html.*

Howstuffworks; "The Serial Connection"; Jun. 5, 2003; http://web.archive.org/web/20030605040923/http://computer.howstuffworks.com/serial-port2.htm; p. 2.*

"Computer Hardware: Information about the serial port / com port"; Mar. 2, 2000; http://web.archive.org/web/20000302200831/http://www.computerhope.com/help/serial.htm; pp. 3-4.*

Chinese Patent Office Action dated May 9, 2008 for corresponding Chinese Patent Application No. 200510071795 and English language translation thereof.

* cited by examiner

SYSTEM AND CONTROLLER WITH REDUCED BUS UTILIZATION TIME

BACKGROUND OF THE INVENTION

This application claims the priority of Korean Patent Application No. 2004-11014, filed on Feb. 19, 2004, in the Korean Intellectual Property Office, the disclosure of which is incorporated herein in its entirety by reference.

FIELD OF THE INVENTION

Exemplary embodiments of the present invention relate to a system, a memory controller, main controller, data reading unit, serial interface, and pre-fetch unit.

DESCRIPTION OF THE CONVENTIONAL ART

In the conventional systems, a flash memory may be used to store executing programs and/or data in a system adopting a system-on-chip (SOC). A number of pins for the SOC may be altered according to various application fields. The demand for an SOC having a lesser number of pins has increased. An SOC may use a serial flash memory rather than a parallel flash memory and the serial flash memory may have a lesser number of pins. The serial flash memory may have one data pin to receive and/or transfer data in series. The serial flash memory may be connected to the SOC, the SOC may need two data pins to receive and transfer data with the serial flash memory. The serial flash memory may have a lower bandwidth compared to the parallel flash memory because the serial flash memory may receive various signals, which may include addresses and/or data transferred from the SOC through a single data pin.

A memory controller for interfacing with the serial flash memory may be included within the SOC. The memory controller may be connected to a plurality of intellectual property (IP) blocks through a memory bus, and reads data from the serial flash memory in response to a request to read data from one of the plurality of the IP blocks. Data transmission between the serial flash memory and a conventional memory controller may include transmitting instructions from the memory controller to the serial flash memory, transmitting a read address from the memory controller to the serial flash memory, and transmitting a read data from the serial flash memory to the memory controller. The memory controller may read data from the flash memory using the process described above according to a read request signal of one of the IP blocks received through the memory bus, and may transmit the read data to a corresponding IP block through the memory bus. The conventional memory controller may receive a read address signal through the memory bus, and may take a longer time to read data corresponding to the read address signal from the serial flash memory and a time of using the memory bus by the memory controller may increase. The overall efficiency of the SOC may be lowered when the possession time of the memory bus by the memory controller increases because the IP blocks may not use the memory bus until the data transmission by the memory controller may finish.

SUMMARY OF THE INVENTION

In an exemplary embodiment of the present invention, a system may include a processor, at least one IP block, and a memory controller. The memory controller may store a control data signal received from the processor through a first bus, may control a memory by generating a request data signal based on the stored control data signal, may store a plurality of read address signals received from at least one of the processor and the at least one IP block through a second bus, and may read data from a memory by generating a command data signal based on one of the plurality of read address signals.

Another exemplary embodiment of the system may include a processor, at least one IP block, a direct memory access controller, which may generate direct memory access address signals, and a memory controller. The memory controller may store a control data signal received from processor through a first bus, may control a memory by generating a request data signal based on the stored control data signal, may transmit DMA address signals through a second bus, may store at least one of a plurality of read address signals and a plurality of DMA address signals received from at least one of the processor and the at least one IP block through a third bus, and may read data from the memory by generating a command data signal based on at least one of the read address signals and DMA address signals.

In another exemplary embodiment of the present invention, a memory controller may include a main controller, a data reading unit, and a serial interface. The main controller may store a control data signal received from a processor through a first bus, and may control a memory by generating a request data signal based on the stored control data signal. The data reading unit may store read address signals received from at least one of the processor and IP blocks through a second bus, and may read data from the memory by generating command data signals based on the read address signals. A serial interface may interface at least one of the main controller and the data reading unit with the memory.

Another exemplary embodiment of the memory controller may include a main controller, a DMA controller, a data reading unit, and a serial interface. The main controller may store a control data signal received from a processor through a first bus, and may control a memory by generating a request data signal based on the control data signal. The DMA controller may be connected to a second bus through a third bus, and may transmit address signals through the third bus. The data reading unit may be connected to the second bus through a fourth bus, may store at least one of read address signals and the address signals received from at least one of the processor and at least one IP block through the fourth bus, and may read data from the memory by generating a command data signal based on the address signals. The serial interface may interface at least one of the main controller and the data reading unit with the memory.

In another exemplary embodiment of the present invention, a data reading unit may store read address signals received from at least one of a processor and at least one IP block through a first bus, and may read data from a memory by generating a command data signal based on the read address signal.

In another exemplary embodiment of the present invention, a pre-fetch unit may store data signals received from a memory through a serial interface after pre-fetching the data signals in response to a pre-fetch start signal, may stop the storing of the data signals in response to a pre-fetch stop signal, and may output a matching signal and a matching data signal to a data reading unit when the matching data signal that corresponds to a read address signal exist among the data signals in response to the address comparison signal.

In exemplary embodiments of the present invention, the control data signals may include a command signal.

In exemplary embodiments of the present invention, the data reading unit may generate an address comparison signal when at least one of the read address signals is received and the pre-fetch unit may output a matching data signal with a matching signal to the data reading unit when the matching data signal, which corresponds to at least one of the read address signals exists in response to the address comparison signal.

In exemplary embodiments of the present invention, the main controller may further include a generator, a storage unit, a decoder, a controller, and a first multiplexer.

In exemplary embodiments of the present invention, the status control register may store status information signal received from at least one of the data reading unit and the serial interface in response to at least one of the register control signals. The control signal generator may generate second selection control signals in response to at least one of the transmission control signal and the control address signal. The main controller may further include a second multiplexer.

In exemplary embodiments of the present invention, the storage unit may include a plurality of registers, and at least one of the plurality of registers may store the command signal.

In exemplary embodiments of the present invention, the control data signal may further include write address signals and write data signals, and at least one of the plurality of registers may store the write address signals, and at least one of the plurality of registers may store at least one of the write data signals and the read address signals.

In exemplary embodiments of the present invention, the main controller may further include a third multiplexer, and a data buffer unit.

In exemplary embodiments of the present invention, the data reading unit may receive direct memory access address signals from a direct memory access controller through the second bus, may read direct memory access data from the memory by generating the command data signal based on the direct memory access address signals, and may provide the direct memory access data to the direct memory access controller through the second bus.

In exemplary embodiments of the present invention, the data reading unit may include a controller, a first multiplexer, an address register, a second multiplexer, and a third multiplexer.

In exemplary embodiments of the present invention, the main controller may further a fourth multiplexer and a data buffer.

In exemplary embodiments of the present invention, the main controller may output a pre-fetch start signal, a pre-fetch stop signal, and an address comparison signal in response to a status control signal received from the main controller, and may output the third selection control signal in response to matching signal.

In exemplary embodiments of the present invention, the main controller may further include a pre-fetch unit.

In exemplary embodiments of the present invention, the data reading unit may include a controller, a first multiplexer, an address register, a second multiplexer, and a third multiplexer.

In exemplary embodiments of the present invention, the data reading unit may further include a fourth multiplexer and a data buffer.

In exemplary embodiments of the present invention, the main controller may further include a pre-fetch unit and a DMA controller.

In exemplary embodiments of the present invention, the main controller may include a data reading unit, which may further include a fifth multiplexer.

In exemplary embodiments of the present invention, the main controller may store a control data signal received from a processor through a first bus and may control a memory by generating a request data signal based on the stored control data signal.

In exemplary embodiments of the present invention, the main controller may include a generator, a storage unit, a decoder, a controller, and a first multiplexer.

In exemplary embodiments of the present invention, the data reading unit may include a controller, an address register, a first multiplexer, and a second multiplexer.

In exemplary embodiments of the present invention, the serial interface may include an entry arbiter, a controller, a multiplexer, a serial register, and a data register.

In exemplary embodiments of the present invention, the pre-fetch unit may include a controller, an address buffer, a data buffer unit, an address comparator, and a multiplexer.

In exemplary embodiments of the present invention, the DMA controller may be included in the controller.

BRIEF DESCRIPTION OF THE DRAWINGS

Exemplary embodiments of the present invention will become more apparent by describing in detail exemplary embodiments thereof with reference to the attached drawings in which.

DETAILED DESCRIPTION OF THE EXEMPLARY EMBODIMENTS OF THE PRESENT INVENTION

Figure 1:
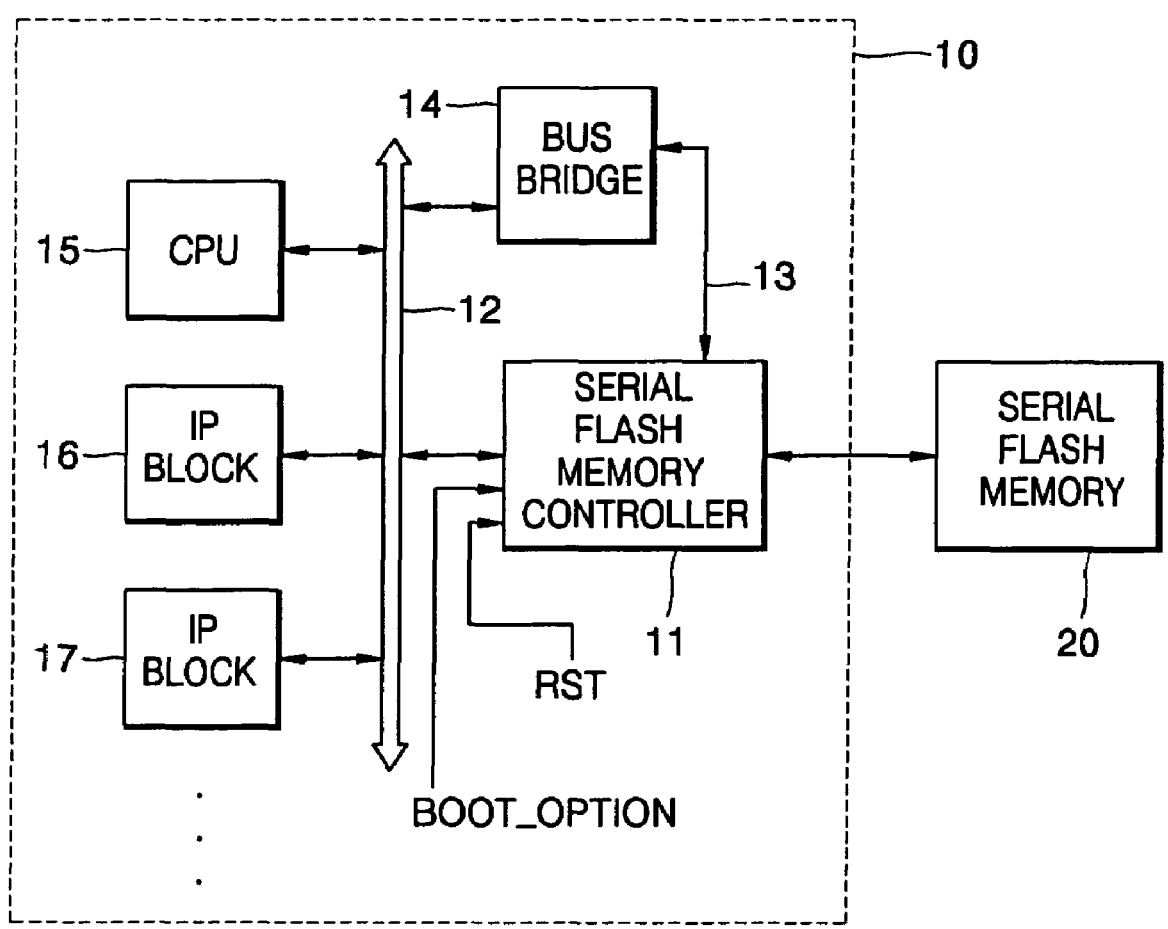
FIG. 1 is a block diagram of an exemplary embodiment of a system-on-chip (SOC), which may include memory controller and a memory, according to the present invention.

Exemplary embodiments of the present invention will now be described more fully with reference to the accompanying drawings, in which exemplary embodiments of the present invention are shown. The same reference numerals are used to denote the same elements throughout the drawings FIG. 1 is a block diagram of an exemplary embodiment of a system (e.g., system-on-chip (SOC)) 10, which may include a memory controller (e.g., a serial flash memory controller) and a memory (e.g., a serial flash memory) 20, according to the present invention. Referring to FIG. 1, the system 10 may include a memory controller (e.g., a serial flash memory controller) 11, a bus bridge 14, a processor (CPU) 15, and intellectual property (IP) blocks 16 and 17. The system 10 may also include additional IP blocks.

The memory controller 11, the processor 15, and the IP blocks 16 and 17 may communicate through a bus (e.g., a memory bus) 12. The memory controller 11 may be connected to a memory (e.g., external serial flash memory) 20.

The memory controller 11 may read data from the memory 20 according to a data read request received through the bus 12 from the processor 15 and/or at least one of the IP blocks 16 and 17. The memory controller 11 may transmit the read data to the processor 15 and/or at least one of the IP blocks 16 and 17, which may request the data through the bus 12.

The bus bridge 14 may be connected between the bus 12 and a bus (e.g., peripheral bus) 13, and the memory controller 11, may be connected to the bus 13. The bus bridge 14 may transform signals transmitted between the bus 12 and the bus 13 into signals in accordance with a bus protocol. The bus protocol may be any suitable bus protocol. The memory controller 11 may perform control operations according to a control data signal received from the processor 15 through the bus 13, for example, writing and/or deleting data stored at an address of the memory 20, and may provide status information for the memory 20 and/or the memory controller 11 to the processor 15.

The memory controller 11 may generate a read command signal in a form corresponding to the memory 20 in response to a command selection signal BOOT_OPTION received from an external device. The memory controller 11 may be used in any suitable type of memory. The memory controller 11 may be reset in response to a reset signal RST received from an external device.

Figure 2:
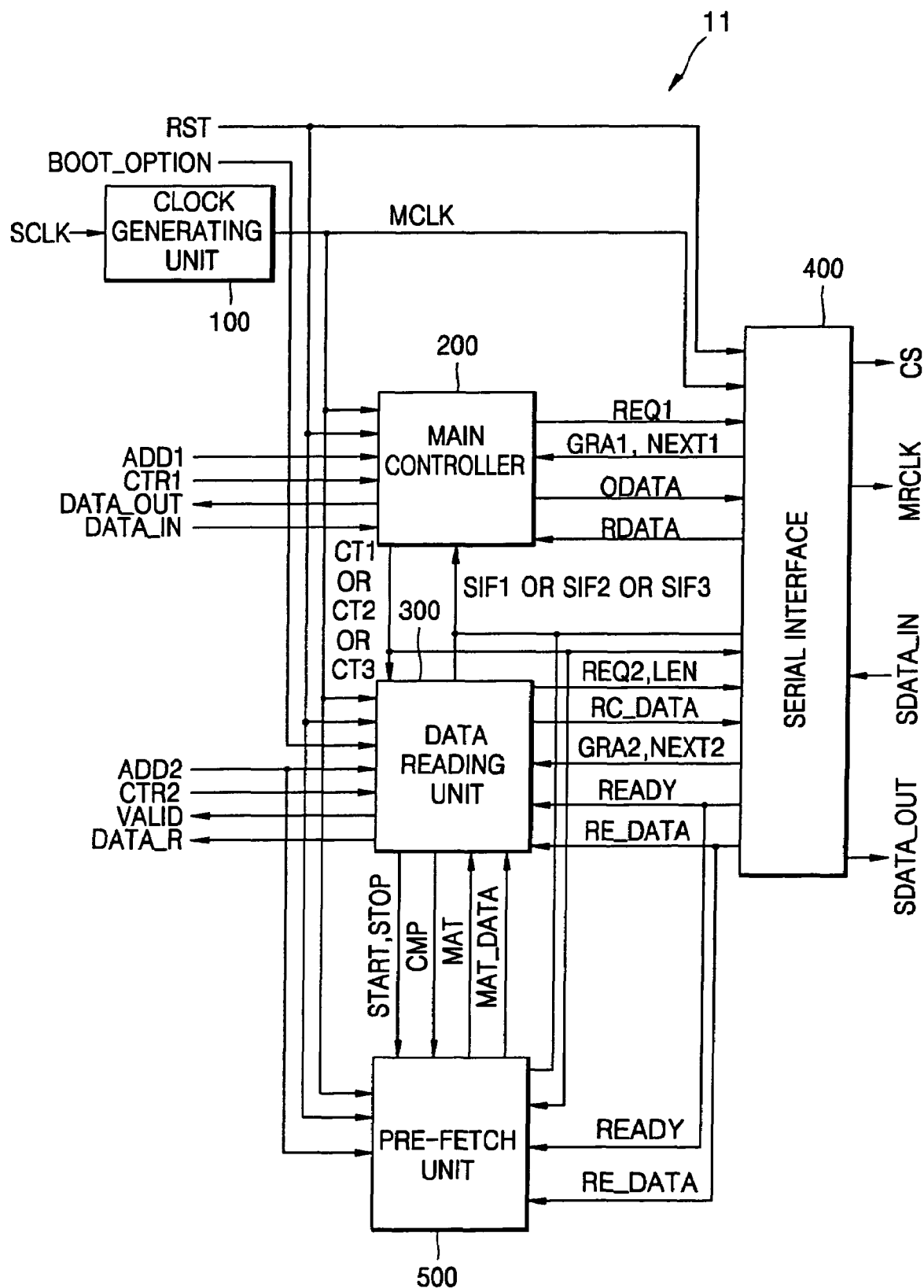
FIG. 2 is a block diagram of an exemplary embodiment of the memory controller of FIG. 1.

FIG. 2 is a block diagram of an exemplary embodiment of the memory controller 11. Referring to FIG. 2, the memory controller 11 may include a clock generator unit 100, a main controller 200, a data reading unit 300, a serial interface 400, and a pre-fetch unit 500. The clock generator unit 100 may receive a system clock signal SCLK from the bus 12, and may output a memory clock signal MCLK, for example, by dividing the received system clock signal SCLK into a ratio. The memory clock signal MCLK may be provided to the components of the memory controller 11. The main controller 200 may be connected to the bus bridge 14 through the bus 13. The main controller 200 may receive a transmission control signal CTR1, a control address signal ADD1, and a control data signal DATA_IN from the processor 15 through the peripheral bus 13. The main controller 200 may store the control data signal DATA_IN in response to the transmission control signal CRT1 and/or the control address signal ADD1. The main controller 200 may control the memory 20 and/or control at least one of the data reading unit 300, the serial interface 400, and the pre-fetch unit 500 through the serial interface 400, according to a command included in the control data signal DATA_IN. A control operation command for the memory 20 may be included in the control data signal DATA_IN and the main controller 200 may transmit a first transmission request signal REQ1 to the serial interface 400. The main controller 200 may receive a transmission granting signal GRA1 from the serial interface 400 and the main controller 200 may generate a request data signal ODATA based on the control data signal DATA_IN and may transmit the request data signal ODATA to the serial interface 400. The main controller 200 may store a request result data signal RDATA received from the serial interface 400, and may transmit the request result data signal RDATA as a result data signal DATA_OUT to the processor 15 through the bus 13.

A control operation command for the data reading unit 300 may be included in the control signal DATA_IN and the main controller 200 may generate and transmit a status control signal CT1, based on the control data signal DATA_IN, to the data reading unit 300. The status control signal CT1 may request current operation status information of the data reading unit 300 and/or instruct the data reading unit 300 to perform an operation. For example, the data reading unit 300 may control an operation of the pre-fetch unit 500 in response to the status control signal CT1.

A control operation command for the serial interface 400 may be included in the control data signal DATA_IN and the main controller 200 may generate and transmit a status control signal CT2, based on the control data signal DATA_IN, to the serial interface 400. The status control signal CT2 may request current operation status information of the serial interface 400 and/or may instruct the serial interface 400 to perform an operation.

A control operation command for the pre-fetch unit 500 may be included in the control data signal DATA_IN and the main controller 200 may generate and transmit a status control signal CT3, based on the control data signal DATA_IN, to the pre-fetch unit 500. The status control signal CT3 may request current operation status information of the pre-fetch unit 500 and/or instruct pre-fetch unit 500 to perform an operation.

The data reading unit 300 may be connected to the processor 15 and/or the IP blocks 16 and 17 through the bus 12 (see FIG. 1). The data reading unit 300 may receive a transmission control signal CTR2 and/or a read address signal ADD2 from the Processor 15 and/or one of the IP blocks 16 and 17 through the bus 12. The data reading unit 300 may store the read address signal ADD2 and may transmit a transmission request signal REQ2 to the serial interface 400 in response to the transmission control signal CTR2.

The data reading unit 300 may transmit read data length information LEN and a command data signal RC_DATA to the serial interface 400, for example, after receiving a transmission granting signal GRA2 from the serial interface 400. The data reading unit 300 may generate the command data signal RC_DATA based on the read address signal ADD2 and/or a read command signal READ produced within the data reading unit 300.

The data reading unit 300 may receive and store a data signal RE_DATA, which may correspond to the read address signal ADD2, through the serial interface. The data reading unit 300 may output the stored data signal RE_DATA to the bus 12 as a read data signal DATA_R.

The status control signal CT1 may include pre-fetch control operation information and the data reading unit 300 may output a pre-fetch start signal START and a pre-fetch stop signal STOP to the pre-fetch unit 500. The pre-fetch unit 500 may perform a pre-fetch operation of the data signal RE_DATA.

The pre-fetch operation of the pre-fetch unit 500 may be completed and the data reading unit 300 may output an address comparison signal CMP to the pre-fetch unit 500, for example, when the read address signal ADD2 is received. The data reading unit 300 may receive a matching signal MAT and the matching data signal MAT_DATA from the pre-fetch unit 500 and the data reading unit 300 may store the matching data signal MAT_DATA. The data reading unit 300 may output the stored matching data signal MAT_DATA to the bus 12, for example, as the read data signal DATA_R. The data reading unit 300 will be described in more detail with reference to FIG. 4.

The serial interface 400 may interface the main controller 200 and the memory 20, for example, in response to the transmission request signal REQ1 from the main controller 200. The serial interface 400 may interface the data reading unit 300 and the memory 20, for example, in response to the transmission request signal REQ2, which may be received from the data reading unit 300. The serial interface 400 may interface the main controller 200 and/or the data reading unit 300 with the memory 20 according to, for example, a priority order when the serial interface 400 receives the transmission request signals REQ1 and REQ2, for example, simultaneously. The serial interface 400 may interface the main controller 200 and/or the data reading unit 300 with the memory 20.

The pre-fetch unit 500 may receive the pre-fetch start signal START and the pre-fetch unit 500 may store the read address signal ADD2 received through the memory bus 12. The pre-fetch unit 500 may store the data signal RE_DATA received from the serial interface 400. The pre-fetch unit 500 may receive the pre-fetch stop signal STOP and the pre-fetch unit 500 may interrupt the storing operation of the data signal RE_DATA. The pre-fetch unit 500 may determine whether a matching data signal MAT_DATA corresponding to the received read address signal ADD2 exists among the stored data signal RE_DATA, for example, when the pre-fetch unit 500 receives the address comparison signal CMP. The matching data signal MAT_DATA corresponding to the received read address signal ADD2 may exist and the pre-fetch unit 500 may transmit the matching data signal MAT_DATA with a matching signal MAT to the data reading unit 300.

Examples of the request data signal ODATA, which may be output from the main controller 200, and the command data signal RC_DATA, which may be output from the data reading unit 300, are illustrated below in the table below according to example control operations.

TABLE 1

| Signal | Components | Description | Control Operation |
| --- | --- | --- | --- |
| ODATA | 1C | 1 byte Command Signal | Enable Write, Disable Write, Enable Write to Status Register, Erase Bulk, Read Status Register |
|  | 1C-1Q | 1 byte Command Signal - 1 byte Data Signal | Write to Status Register |
|  | 1C-3A | 1 byte Command Signal - 3 byte Address Signal | Erase Sector |
|  | 1C-3A-1Q | 1 byte Command Signal - 3 byte Address Signal - 1 byte Data Signal | Byte Program, Automatic Address Incrementing Program |
|  | 1C-3A-NQ | 1 byte Command Signal - 3 byte Address Signal - Continuous Data Signal | Page Program |
| RC_DATA | 1C-3A | 1 byte Command Signal - 3 byte Address Signal | Read Data |

Figure 3:
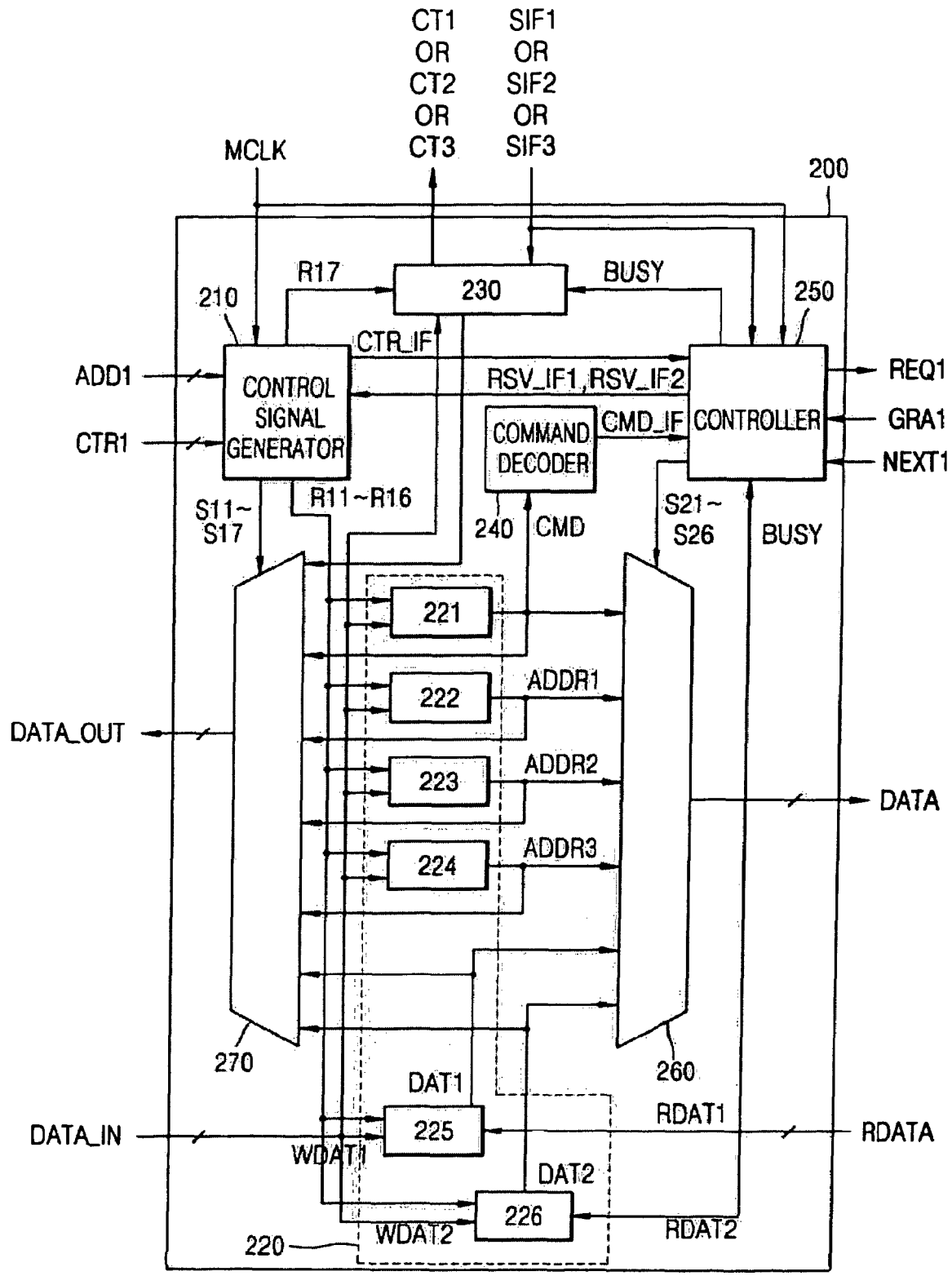
FIG. 3 is a view of an exemplary embodiment of the main controller of FIG. 2.

FIG. 3 illustrates an exemplary embodiment of the main controller 200 of FIG. 2 according to the present invention. Referring to FIG. 3, the main controller 200 may include a generator (e.g., a control signal generator) 210, a storage unit 220, a register (e.g., a status control register) 230, a decoder (e.g., a command decoder) 240, a controller 250, and multiplexers 260 and 270. The generator 210 may output a transmission recognition signal CTR_IF and at least one register of the control signals R11 through R16 in response to a transmission control signal CTR1 and/or a control address signal ADD1 received from the bus 13. The generator 210 may enable or disable the register control signals R11 through R16, for example, after synchronization with the memory clock signal MCLK. The generator 210 may output selection control signals S11 through S17 in response to the transmission request signal CTR1 and/or the control address signal ADD1.

The storage unit 220 may include at least one of registers 221 through 226. The storage unit 220 may further include additional registers. The registers 221 through 226 may store and output a control data signal DATA_IN, received through the bus 13, for example, in response to the register control signals R11 through R 6. The control data signal DATA_IN may include, for example, a command signal CMD or a command signal CMD and address signals ADDR1 through ADDR3. The control data signal DATA_IN may include the command signal CMD, the address signals ADDR1 through ADDR3, and/or data signals WDAT1 and WDAT2. The control data signal DATA_IN may include the command signal CMD and at least one of status control signals CT1. CT2, and CT3. The status control signals CT1. CT2, and CT3 may control an operation, and/or request information on the current operation status, of the data reading unit 300, the serial interface 400, and/or the pre-fetch unit 500.

At least one of the registers 221 through 226 may store the command signal CMD, the address signals ADDR1 through ADDR3, and/or the data signals WDAT1 and WDAT2. For example, the register 221 may store the command signal CMD, the registers 222 through 224 may store the address signals ADDR1 through ADDR3, and the registers 225 and 226 may store the data signals WDAT1 and WDAT2. The registers 225 and 226 may also store data signals RDAT1 and RDAT2, which may be included in a request result data signal RDATA in response to the register control signals R15 and R16. The registers 225 and 226 may store at least one of the data signals WDAT1 and WDAT2 and the data signals RDAT1 and RDAT2. The request result data signal RDATA may include a status signal BUSY, which may indicate the current status of the memory 20.

The register unit 230 may store at least one of the status control signals CT1, CT2, and CT3, which may be included in the control data signal DATA_IN, for example, in response to the register control signal R17. The register unit 230 may receive a status information signal SIF1 from the data reading unit 300 and the register unit 230 may store the status information signal SIF1 in response to the register control signal R17. The register unit 230 may receive a status information signal SIF2 from the serial interface 400 and the register unit 230 may store the status information signal SIF2 in response to the register control signal R17. The register unit 230 may receive a status information signal SIF3 from the pre-fetch unit 500 and the status control register unit 230 may store the status information signal SIF3 in response to the register control signal R17. The status information signals SIF1 through SIF3 may include current operation status information of the data reading unit 300, the serial interface 400, and the pre-fetch unit 500. The register unit 230 may store the status signal BUSY in response to the register control signal R17. The main controller 200 may include additional status control registers.

The command decoder 240 may output command information CMD_IF by decoding the command signal CMD, which may be output from the register 221. The controller 250 may transmit a transmission request signal REQ1 to the serial interface 400 in response to the transmission recognition signal CTR_IF, from the generator 210, and the command information CMD_IF, from the command decoder 240.

A transmission granting signal GRA1 may be received from the serial interface 400 and the controller 250 may output selection control signals S21 through S26 in response to the command information CMD_IF and the memory clock signal MCLK. For example, the controller 250 may enable or disable the selection control signals S21 through S26 through synchronization with the memory clock signal MCLK. The controller 250 may determine control operation the command signal CMD according to the command information CMD_IF.

The request result data signal RDATA is received, for example, through the serial interface 400 and the controller 250 may output a receipt recognition signal RSV_IF1 to the generator 210. The controller 250 may receive and transmit the status signal BUSY included in the request result data signal RDATA to the register unit 230.

The controller 250 may receive at least one of the status information signals SIF1, SIF2, and SIF3 and the controller 250 may transmit a receipt recognition signal RSV_IF2 to the generator 210. The controller 250 may recognize the current operation status of the data reading unit 300, the serial interface 400, and the pre-fetch unit 500 through the reception of at least one of the status information signals SIF1, SIF2, and SIF3.

The multiplexer 260 may select at least one of the output signals from the registers 221 through 226 and may output the selected output signal to the serial interface 400 as the request data signal ODATA in response to the selection control signals S21 through S26. The selection control signals S21 through S26 may be enabled, for example, sequentially, and the multiplexer 260 may select (e.g., sequentially select) the command signal CMD, the address signals ADDR1 through ADDR3, and the data signals DAT1 and DAT2 and may output them as the request data signal ODATA.

The multiplexer 270 may select at least one of the output signals from the registers 221 through 226 or an output signal of the status control register unit 230 and may output the selected output signal to the bus 13 as a result data signal DATA_OUT, for example, in response to the selection control signals S11 through S17.

The register unit 230 may store at least one of the status information signals SIF1, SIF2, and SIF3 and may store at least one of the status control signals CT1, CT2, and/or CT3 in response to the register control signal R17. The register unit 230 may also store the status information BUSY.

FIG. 3 illustrates an exemplary embodiment of the main controller 200. The main controller 200 may perform control operations according to a command included in the control data signal DATA_IN, which may be received from the processor 15 through the bus 13. The command included in the control data signal DATA_IN may be divided according to the object of the control.

The command may be related to a control operation of the memory 20. For example, the command may include an erase request command of data stored in a memory cell corresponding to an address of the memory 20, a write request command of data to a memory cell corresponding to an address of the memory 20, or a data read or write request command to a status register of the memory 20.

The command may be a control operation command for the data reading unit 300, the serial interface 400, and/or the pre-fetch unit 500. The command may include a command requesting current operation status information of, or may set an operation for, at least one of the data reading 300, the serial interface 400, and the pre-fetch unit 500.

For example, the control data signal DATA_IN may include a command signal CMD and address signals ADDR1 through ADDR3, and the main controller 200 may receive (e.g., sequentially receive) the command signal CMD, the address signal ADDR1, the address signal ADDR2, and the address signal ADDR3 through the bus 13.

The transmission request signal CRT1 is received from the CPU 15 through the peripheral bus 13 and the generator 210 may generate and output the transmission recognition signal CTR_IF to the controller 250. The generator 210 may enable (e.g., sequentially enable) the register control signals R1 through R14 in response to the control address signal ADD1 and the memory clock signal MCLK received through the bus 13.

The control address signal ADD1 may be transformed according to the control data signal DATA_IN input to the main controller 200 through the bus 13. The control data signal DATA_IN has the command signal CMD and the control address signal ADD1 may be input to the generator 210. The address signals ADDR1 through ADDR3 may each be different. The control signal generator 210 may control the operation of the registers 221 through 226 of the storage unit 220 and/or the register unit 230 according to the control address signal ADD1.

The registers 221 through 224 may be enabled (e.g., sequentially enabled) in response to the register control signals R11 through R14. The register 221 may store the command signal CMD, and the registers 222 through 224 may store (e.g., sequentially store) the address signals ADDR1 through ADDR3. The generator 210 may enable the register control signals R15 and/or R16, for example, when additional address signals are included in the control data signal DATA_IN. The registers 225 and/or 226 may store the additional address signals in response to the register control signals R15 and/or R16.

The register control signals R15 and/or R16 may be enabled (e.g. sequentially enabled), for example, after the generator 210 enables the register control signal R11 and/or when command signals may be included in the control data signal DATA_IN. The register 221 may store the command signal CMD in response to the register control signal R11, and the registers 225 and/or 226 may store command signals in response to the register control signals R15 and R16.

The generator 210 may disable (e.g., sequentially disable) at least one of the register control signals R11 through R14 in response to the memory clock signal MCLK. The register 221 may output the command signal CMD and at least one of the registers 222 through 224 may output the address signals ADDR1 through ADDR3. The decoder 240 may output command information CMD_IF through decoding the command signal CMD. The controller 250 may transmit the transmission request signal REQ1 to the serial interface 400, for example, in response to the transmission recognition signal CTR_IF and the command information CMD_IF.

The controller 250 may enable (e.g., sequentially enable) at least one the selection control signals S21 through S24, for example, in response to the command information CMD_IF and the memory clock signal MCLK when a transmission granting signal GRA1 from the serial interface 400 may be received. The controller 250 may enable the selection control signal S21, for example, when the transmission granting signal GRA1 is received. The controller 250 may enable the selection control signals S22 through S24, for example, one by one, when a signal NEXT1 is received from the serial interface 400. The multiplexer 260 may select (e.g., sequentially select) the command signal CMD and/or at least one of the address signals ADDR1 through ADDR3 and may output them to the serial interface 400 as the request data signal ODATA, for example, in response to at least one of the selection control signals S21 through S24.

The command requesting writing of data to a memory cell, which may correspond to an address of the memory 20, may be included in the control data signal DATA_IN and the control data signal DATA_IN may include a command signal CMD, at least one of the address signals ADDR1 through ADDR3, and data signals WDAT1 and/or WDAT2. The main controller 200 may receive (e.g., sequentially receive) the command signal CMD, the address signal ADDR1, the address signal ADDR2, the address signal ADDR3, the data signal WDAT1, and the data signal WDAT2 through the bus 13.

The generator 210 may generate and output the transmission recognition signal CTR_IF to the controller 250, for example, when the transmission request signal CRT1 is received from the processor 15 through the bus 13. The generator 210 may enable (e.g., sequentially enable) at least one of the register control signals R11 through R16 in response to the control address signal ADD1 and the memory clock signal MCLK received through the bus 13.

The control data signal DATA_IN may include a command requesting writing of a status register of the memory 20, a command signal CMD, and data signals WDAT1 and WDAT2. For example, the main controller 200 may receive (e.g., sequentially receive) the command signal CMD, the data signal WDAT1, and the data signal WDAT2 through the bus 13.

The generator 210 may generate and output the transmission recognition signal CTR_IF to the controller 250, for example, when the first transmission request signal CRT1 is received from the processor 15 through the bus 13. The generator 210 may enable (e.g., sequentially enable) the register control signals R11, R15 and R16 in response to the control address signal ADD1 and the memory clock signal MCLK received through the bus 13.

The control data signal DATA_IN may include a command requesting reading of a status register of the memory 20 and a command signal CMD.

The generator 210 may generate and output the transmission recognition signal CTR_IF to the controller 250, for example, when the first transmission request signal CRT1 is received from the processor 15 through the bus 13. The generator 210 may enable the register control signal R11, for example, in response to the control address signal ADD1 and the memory clock signal MCLK received through the bus 13. The register 221 may store the command signal CMD in response to the register control signal R11. The generator 210 may disable the register control signal R11, and may enable the register control signals R11 and R16. The register 221 may output the command signal CMD in response to the register control signal R11.

The command decoder 240 may output the command information CMD_IF, for example, after decoding the command signal CMD, and the controller 250 may transmit the transmission request signal REQ1 to the serial interface 400 in response to the transmission recognition signal CTR_IF and/or the command information CMD_IF. The controller 250 may enable the selection control signal S21 in response to the command information CMD_IF and the memory clock signal MCLK, for example, when a transmission granting signal GRA1 is received from the serial interface 400. The multiplexer 260 may output the command signal CMD to the serial interface 400 as the request data signal ODATA in response to the selection control signal S21.

The main controller 200 may receive a request result data signal RDATA, which may be data read from a status register of the memory 20, through the serial interface 400. The request result data signal RDATA may include data signals RDAT1 and RDAT2.

The registers 225 and 226 may store the data signals RDAT1 and RDAT2 in response to the register control signals R15 and R16. The controller 250 may output a receipt recognition signal RSV_IF1 to the generator 210, for example, when the request result data signal RDATA is received. The generator 210 may disable the register control signals R15 and R16, and may enable (e.g., sequentially enable) the selection control signals S16 and S17 in response to the receipt recognition signal RSV_IF1.

The registers 225 and 226 may output the data signals RDAT1 and RDAT2 in response to the register control signals R15 and R16. The multiplexer 270 may select and transmit (e.g., sequentially select) the data signals RDAT1 and RDAT2 to the bus 13 through the CPU 15, for example, in the form of result data signal DATA_OUT, in response to the selection control signals S16 and S17.

The command requesting current operation status information for at least one of the data reader 300, the serial interface 400, and the pre-fetch unit 500 may be included in the control data signal DATA_IN along with a command signal CMD and at least one of status control signals CT1 through CT3.

The generator 210 may generate and output the transmission recognition signal CTR_IF to the controller 250, for example, when the transmission request signal CRT1 is received from the processor 15 through the bus 13. The generator 210 may enable (e.g., sequentially enable) the register control signals R11 and R17 in response to the control address signal ADD1 and the memory clock signal MCLK, which may be received through the bus 13. The register 221 may store the command signal CMD in response to the register control signal R11, and the register unit 230 may store at least one of the status control signals CT1 through CT3, which may be received in response to the register control signal R17.

The generator 210 may disable the register control signal R11 in response to the memory clock signal MCLK. The register 221 may output the command signal CMD in response to the register control signal R11. The command decoder 240 may output the command information CMD_IF by decoding the command signal CMD. The controller 250 may acknowledge that the command signal CMD may be requesting current operation status information for at least one of the data reader 300, the serial interface 400, and the pre-fetch unit 500 from the command information CMD_IF.

The generator 210 may disable the register control signal R17 in response to the memory clock signal MCLK. The register unit 230 may transmit at least one of the stored status control signals CT1 through CT3 to at least one of the data reader 300, the serial interface 400, and the pre-fetch unit 500 in response to the register control signal R17. The data reader 300 may respond to the signal CT1 and may transmit a status information signal SIF1 to the status control register unit 230 and/or the controller 250, for example, when the status control signal CT1 may be output from the status control register unit 230. The serial interface 400 may respond to the status control signal CT2, and may transmit a status information signal SIF2 to the register unit 230 and/or the controller 250 when the status control signal CT2 may be output from the status control register unit 230. The pre-fetch unit 500 may respond to the status control signal CT3, and may transmit a status information signal SIF3 to the register unit 230 and/or the controller 250, for example, when the status control signal CT3 is output from the register unit 230.

The controller 250 may output a receipt recognition signal RSV_IF2 to the generator 210, for example, when at least one of the status information signals SIF1 through SIF3 is received. The generator 210 may enable the register control signal R17 and the selection control signal S17 in response to the receipt recognition signal RSV_IF2.

The register unit 230 may store one of the status information signals SIF1 through SIF3, which may be received in response to the register control signal R17. The generator 210 may disable the register control signal R17, and the register unit 230 may output the stored status information signal (e.g., at least one of SIF1, SIF2, and SIF 3), for example, in response to the register control signal R17. The multiplexer 270 may transmit the status information signal (e.g., at least one of SIF1, SIF2, and SIF 3), which may be output from the status control register unit 230, to the processor 15 through the bus 13, for example, in response to the selection control signal S17.

The processor 15 may request information stored in at least one of the registers 221 through 226 of the main controller 200. The generator 210 may disable all, or substantially all, of the register control signals R11 through R16, and may enable the selection control signals S11 through S17, for example, one by one, in response to the transmission control signal CTR1. The registers 221 through 226 may output the command signal CMD, at least one of the address signals ADD1 through ADD3, and at least one of the data signals DAT1 and DAT2 in response to the register control signals R11 through R16. The multiplexer 270 may select output signals of the registers 221 through 226, for example, one by one, in response to the selection control signals S11 through S17 and may output the output signals to the bus 13.

Figure 4:
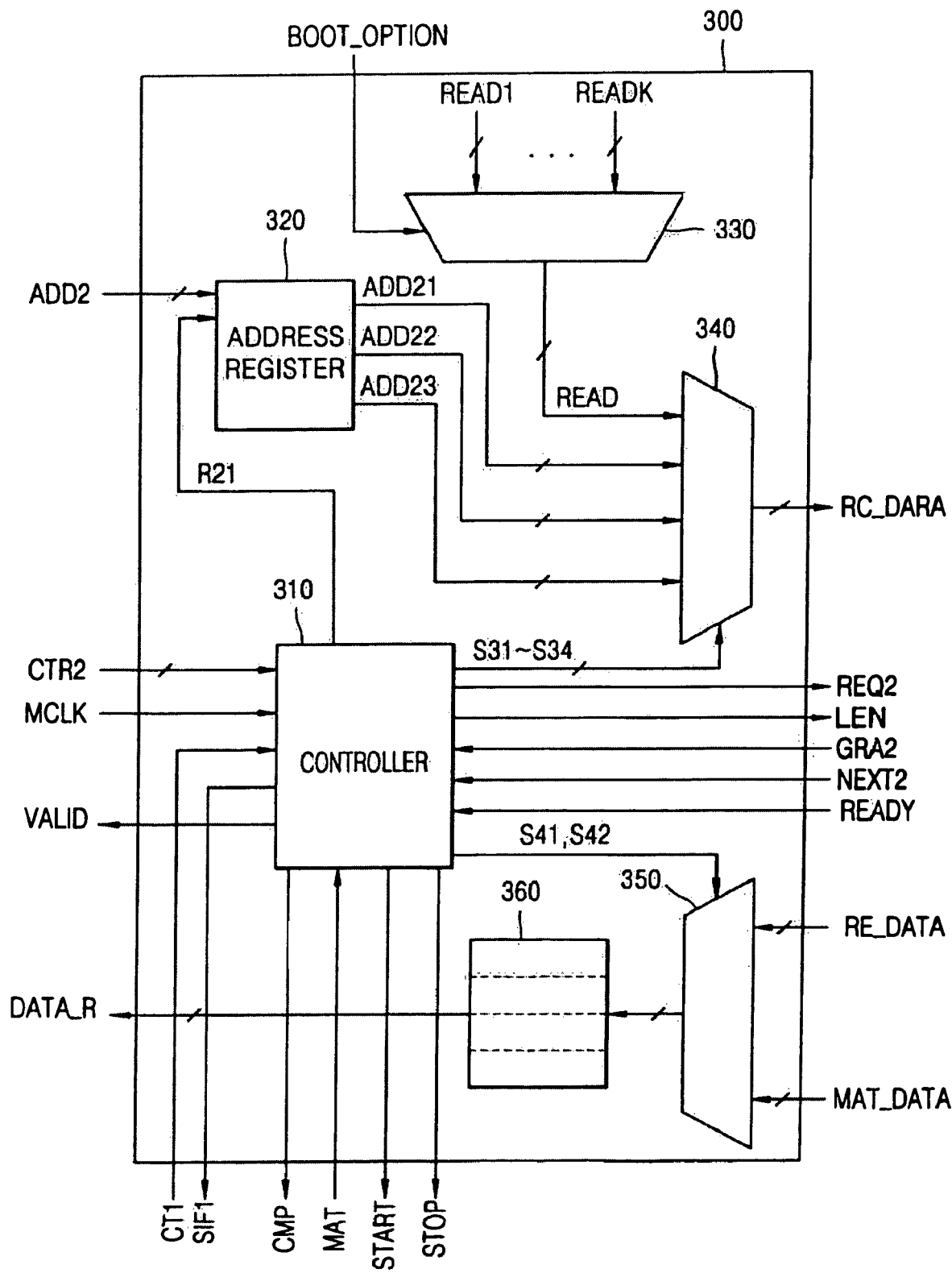
FIG. 4 is a view of an exemplary embodiment of the data reading unit of FIG. 2.

FIG. 4 is an exemplary embodiment of the data reader 300 of FIG. 2 according to the present invention. An exemplary embodiment of the data reading unit 300 may include a controller 310, a register, (e.g., an address register) 320, multiplexers 330, 340, and 350, and a data buffer 360.

The controller 310 may receive the transmission control signal CTR2 from at least one of the processor 15 and at least one of the IP blocks 16 and 17 through the bus 12. The controller 310 may output the transmission request signal REQ2 to the serial interface 400, and may enable a register control signal R21, for example, in response to the transmission control signal CTR2. The controller 310 may output the read data length information LEN to the serial interface 400, may disable the register control signal R21, and may enable a selection control signal S31, for example, when the transmission granting signal GRA2 is received from the serial interface 400. The controller 310 may enable at least one of the selection control signals S32 through S34, for example, one by one, when a receipt completion signal NEXT2 is received from the serial interface 400.

The controller 310 may respond to the status control signal CT1, which may be received from the main controller 200 and may control the operation of the pre-fetch unit 500. When the status control signal includes information related to the pre-fetch control operation, the pre-fetch control operation may be set in the controller 310, for example, by the status control signal CT1. The controller 310 may output the pre-fetch start signal START and the pre-fetch stop signal STOP to the pre-fetcher 500 at, for example, intervals of time. The controller 310 may request the matching data signal MAT_DATA by outputting the address comparison signal CMP to the pre-fetch unit 500. The controller 310 may disable a selection control signal S41 and may enable a selection control signal S42, for example, when the controller 310 receives the matching signal MAT from the pre-fetch unit 500. The controller 310 may enable the selection control signal S41 and may disable the selection control signal S42, for example, when the controller 310 does not receive the matching signal MAT from the pre-fetch unit 500.

The pre-fetch control operation may not be set in the controller 310, the controller 310 may not output the pre-fetch start signal START to the pre-fetch unit 500 and the pre-fetch unit 500 may not perform the pre-fetch operation.

The controller 310 may receive a transmission ready signal READY a number of times from the serial interface 400 and the controller 310 may enable and output a valid signal VALID to the bus 12. The block (e.g., the processor 15 and/or at least one of the IP blocks 16 and 17), which may request transmission of data to the data reading unit 300, may acknowledge that the read data signal DATA_R received through the bus 12 may be valid. The controller 310 may acknowledge that the data signals RE_DATAs may be stored in all, or substantially all, of the data buffers, which may be included in the data buffer 360, for example, when transmission ready signal READY may have been received a number of times. The controller 310 may enable the valid signal VALID, for example, when the data signals RE_DATAs may be stored in all, or substantially all of the data buffers in the data buffer 360.

The status control signal CT1 may include information requesting a current operation status of the data reading unit 300 and the controller 310 may transmit the status information signal SIF1 to the main controller 200, for example, in response to the status control signal CT1.

The address register 320 may store the read address signal ADD2 received through the bus 12, for example, when the register control signal R21 is enabled. The read address signal ADD2 may include N bit(s) and N may be an integer. The address register 320 may output the stored read address signal ADD2 by N/3 bit(s), for example, when the register control signal R21 is disabled. The address register 320 may output read address signals ADD21 through ADD23, for example, by dividing the read address signal ADD2 into groups of 8 bits when the read address signal ADD2 is 24 bits.

The multiplexer 330 may select at least one of command signals READ1 through READK, where K may be an integer, and may output the at least one selected command signal to the second multiplexer 340, for example, as a read command signal READ in response to a command selection signal BOOT_OPTION received from an external device. The multiplexer 330 may hold an output of the read command signal READ, for example, until the operation of the system 10 (see FIG. 1) may be completed. At least one of the command signals READ1 through READK may include, for example, a plurality of bits, and each may be generated from separate command signal generators (not shown). The command signals READ1 through READK may have the same or different bit values. The command selection signal BOOT_OPTION may change, for example, according to the type of memory 20. The multiplexer 330 may output the read command signal READ in a form, which may correspond to a type of the memory 20.

The multiplexer 340 may select at least one of the read command signal READ and the read address signals ADD21 through ADD 23 and may output the selected signal to the serial interface 400, for example, as the command data signal RC_DATA in response to the selection control signals S31 through S34. The multiplexer 340 may select and output the read command signal READ and/or the read address signals ADD21 through ADD23, for example, one by one, as the command data signal RC_DATA, for example, in response to the enablement (e.g., the successive enablement) of the selection control signals S31 through S34.

The multiplexer 350 may select and output at least one of the data signal RE_DATA received from the serial interface 400 and the matching data signal MAT_DATA received from the pre-fetch unit 500, for example, in response to the selection control signals S41 and S42. The data buffer 360 may include a plurality of data buffers (not shown). The data buffer 360 may store at least one of the data signal RE_DATA and the matching data signal MAT_DATA received from the multiplexer 350, and may output the stored data signals to the bus 12 as the read data signal DATA_R.

The controller 310 may transmit the transmission request signal REQ2 to the serial interface 400, and may enable the register control signal R21, for example, when the controller 310 receives the transmission control signal CTR2 through the bus 12. The address register 320 may store the read address signal ADD2, for example, in response to the register control signal R21. The controller 310 may output the read data length information LEN to the serial interface 400, may disable the register control signal R21, and may enable the selection control signal S31, for example, when the controller 310 receives the transmission granting signal GRA2 from the serial interface 400.

The address register 320 may divide the read address signal ADD2 into, for example, 8 bits each, and may output the read address signal ADD2 as the read address signals ADD21 through ADD23 in response to the register control signal R21. The multiplexer 330 may select at least one of the command signals READ1 though READK and may output the selected command signal as the read command signal READ in response to the command selection signal BOOT_OPTION, which may be received from an external device.

The multiplexer 340 may select and transmit the read command signal READ to the serial interface 400 as the command data signal RD_DATA in response to the selection control signal S31. The controller 310 may disable the selection control signal S31 and may enable the selection control signal S32, for example, when the receipt completion signal NEXT2 is received from the serial interface 400. The multiplexer 340 may select and output the read address signal ADD21 as the command data signal RC_DATA, for example, in response to the selection control signal S32. The controller 310 may enable (e.g., sequentially enable) the selection control signals S33 and S34, for example, when the receipt completion signal NEXT2 is received. The multiplexer 340 may select (e.g., sequentially select) and output the read address signals ADD22 and ADD23 as the command data signal RC_DATA.

The controller 310 may enable the selection control signal S41 in response to the memory clock signal MCLK. For example, in response to the selection control signal S41, the multiplexer 350 may output the data signal RE_DATA received from the serial interface 400 to the data buffer 360. The data buffer 360 may store the data signal RE_DATA received from the multiplexer 350, and may output the data signal RE_DATA to the bus 12 as the read data signal DATA_R. The controller 310 may enable and output the valid signal VALID to the bus 12, for example, when the received number of the transmission ready signals READY reaches a threshold.

The controller 310 may output the pre-fetch start signal START to the pre-fetch unit 500, for example, when the pre-fetch control operation is set to the controller 310, and may output the pre-fetch stop signal STOP to the pre-fetch unit 500, for example, at the end of a time interval.

The controller 310 may output the address comparison signal CMP to the pre-fetch unit 500, for example, when the transmission control signal CTR2 is received. The controller 310 may disable the selection control signal S41 and may enable the selection control signal S42, for example, when the matching signal MAT is received from the pre-fetch unit 500. The multiplexer 350 may output the matching data signal MAT_DATA received from the pre-fetch unit 500 to the data buffer 360, for example, in response to the selection control signal S42. The controller 310 may output the transmission request signal REQ2 to the serial interface 400 to read the data signal RE_DATA from the memory 20, for example, if the matching signal MAT is not received from the pre-fetch unit 500.

Figure 5:
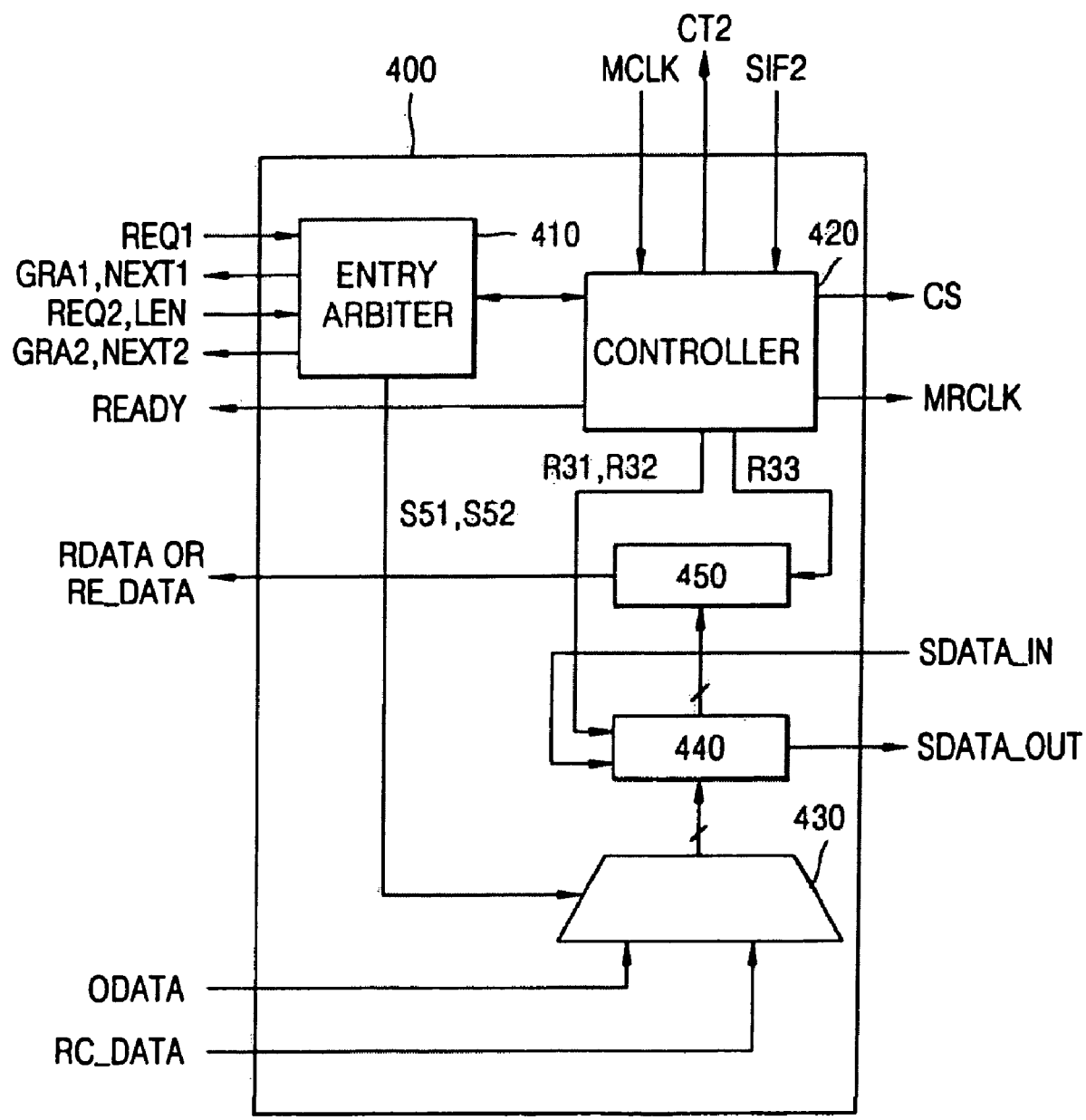
FIG. 5 is a view of an exemplary embodiment of the serial interface of FIG. 2.

FIG. 5 is an exemplary embodiment of the serial interface 400 of FIG. 2 according to the present invention. Referring to FIG. 5, an exemplary embodiment of the serial interface 400 may include an entry arbiter 410, a controller 420, a multiplexer 430, a serial register 440, and a data register 450.

The entry arbiter 410 may transmit the transmission request signal REQ1 received from the main controller 200 to the controller 420, and may enable a selection control signal S51. The entry arbiter 410 may transmit the transmission granting signal GRA1 and the receipt completion signal NEXT1 received from the controller 420 to the main controller 200. The entry arbiter 410 may transmit the transmission request signal REQ2 received from the data reading unit 300 to the controller 420 and may enable a selection control signal S52. The entry arbiter 410 may transmit the transmission granting signal GRA2 received from the controller 420 to the data reading unit 300.

The entry arbiter 410 may transmit the read data length information LEN received from the data reading unit 300 to the controller 420 and may transmit the receipt completion signal NEXT2 received from the controller 420 to the data reading unit 300.

The entry arbiter 410 may grant a transmission priority to at least one of the main controller 200 and the data reading unit 300 according to a priority order, for example, when the entry arbiter 410 receives (e.g., simultaneously receives) the transmission request signals REQ1 and REQ2. The entry arbiter 410 may transmit at least one of the transmission request signals REQ1 and REQ2, which may have a priority to the controller 420, and may enable at least one of the selection control signals S51 and S52.

The controller 420 may output the transmission granting signal GRA1 to the entry arbiter 410, for example, in response to the transmission request signal REQ1. The controller 420 may output the transmission granting signal GRA2 to the entry arbiter 410, for example, in response to the transmission request signal REQ2. The controller 420 may enable a chip selection signal CS and may transmit the chip selection signal CS with a clock signal MRCLK to the memory 20, for example, when at least one of the transmission request signals REQ1 and REQ2 is received. The controller 420 may generate the clock signal MRCLK based on the memory clock signal MCLK received from the clock generator 100.

The controller 420 may output register control signals R31 through R33 in response to the memory clock signal MCLK, for example, when at least one of the transmission request signals REQ1 and REQ2 is received.

The multiplexer 430 may select and output at least one of the request data signal ODATA received from the main controller 200 and the command data signal RC_DATA received from the data reading unit 300, for example, in response to the selection control signals S51 and S52. The multiplexer 430 may select and output the request data signal ODATA, for example, when the selection control signal S51 is enabled, and may select and output the command data signal RC_DATA, for example, when the selection control signal S52 is enabled.

The serial register 440 may store at least one of the request data signal ODATA and the command data signal RC_DATA, which may be received in parallel from the multiplexer 430, for example, when the register control signal R31 is enabled. The serial register 440 may transmit at least one of the request data signal ODATA and the command data signal RC_DATA, which may be stored in the serial register 440, to the memory 20, for example, as a serial output data signal SDATA_OUT when the register control signal R31 is disabled. The serial register 440 may store a serial input data signal SDATA_IN, which may be received in series from the memory 20, for example, when the register control signal R32 is enabled. The serial register 440 may output the serial input data signal SDATA_IN in parallel to the data register 450, for example, when the register control signal R32 is disabled.

The data register 450 may store the serial input data signal SDATA_IN, which may be received in a parallel from the serial register 440, for example, when the register control signal R33 is enabled. The data register 450 may output the stored serial input data signal SDATA_IN to the main controller 200 as the request result data signal RDATA or to the data reading unit 300 as the data signal RE_DATA, for example, when the register control signal R33 is disabled.

The entry arbiter 410 may transmit at least one of the transmission request signals REQ1 and REQ2, which may be received by the controller 420. The entry arbiter 410 may receive the transmission request signal REQ1 and the entry arbiter 410 may transmit the transmission request signal REQ1 to the controller 420 and may enable the selection control signal S51. The controller 420 may transmit the transmission granting signal GRA1 to the main controller 200 through the entry arbiter 410, for example, in response to the transmission request signal REQ1. The controller 420 may enable the chip selection signal CS and may transmit the chip selection signal CS with the clock signal MRCLK to the memory 20. The controller 420 may enable the register control signal R31.

The multiplexer 430 may output the request data signal ODATA received from the main controller 200, for example, in response to the selection control signal S51. The serial register 440 may store the request data signal ODATA received from the multiplexer 430, for example, in response to the register control signal R31. The controller 420 may disable the register control signal R31, for example, in response to the memory clock signal MCLK. The serial register 440 may transmit (e.g., serially) the stored request data signal ODATA to the memory 20 the serial output data signal SDATA_OUT, for example, in response to the register control signal R31.

The controller 420 may enable the register control signal R31 and may transmit the receipt completion signal NEXT1 to the main controller 200, for example, through the entry arbiter 410. The serial interface 400 may repeat operations until, for example, all, or substantially all, request data signals ODATA are received. The controller 420 may enable the register control signal R32. The serial register 440 may store the serial input data signal SDATA_IN received (e.g., serially) from the memory 20, for example, in response to the register control signal R32. The controller 420 may disable the register control signal R32 and may enable the register control signal R33, for example, in response to the memory clock signal MCLK. The serial register 440 may output the stored serial input data signal SDATA_IN, for example, in parallel to the data register 450 in response to the register control signal R32. The data register 450 may store the serial input data signal SDATA_IN, which may be received from the serial register 440, for example, in response to the register control signal R33. The controller 420 may disable the register control signal R33. The data register 450 may transmit the stored serial input data signal SDATA_IN to the main controller 200, for example, as the request result data signal RDATA in response to the register control signal R33.

The entry arbiter 410 may receive the transmission request signal REQ2 and the entry arbiter 410 may transmit the transmission request signal REQ2 to the controller 420 and may enable the selection control signal S52. The entry arbiter 410 may receive the read data length information LEN from the data reading unit 300 and may transmit the read data length information LEN to the controller 420. The controller 420 may disable the chip selection signals CS and may not supply the clock signal MRCLK, for example, when the serial interface 400 receives serial input data SDATA_IN in a size, which corresponds to the read data length information LEN. For example, if the read data length information LEN is 3 bytes and the data length, which can be stored at the serial register 440 is 8 bits, the controller 420 may disable the chip selection signal CS after repeating the operation of enabling and disabling the register control signal R32 and enabling and disabling the register control signal R33 three times.

The controller 420 may transmit the transmission ready signal READY to the data reading unit 300, for example, when the register control signal R33 is disabled. The data reading unit 300 may receive the data signal RE_DATA, which may be output from the data register 450, for example, in response to the transmission ready signal READY.

Figure 6:
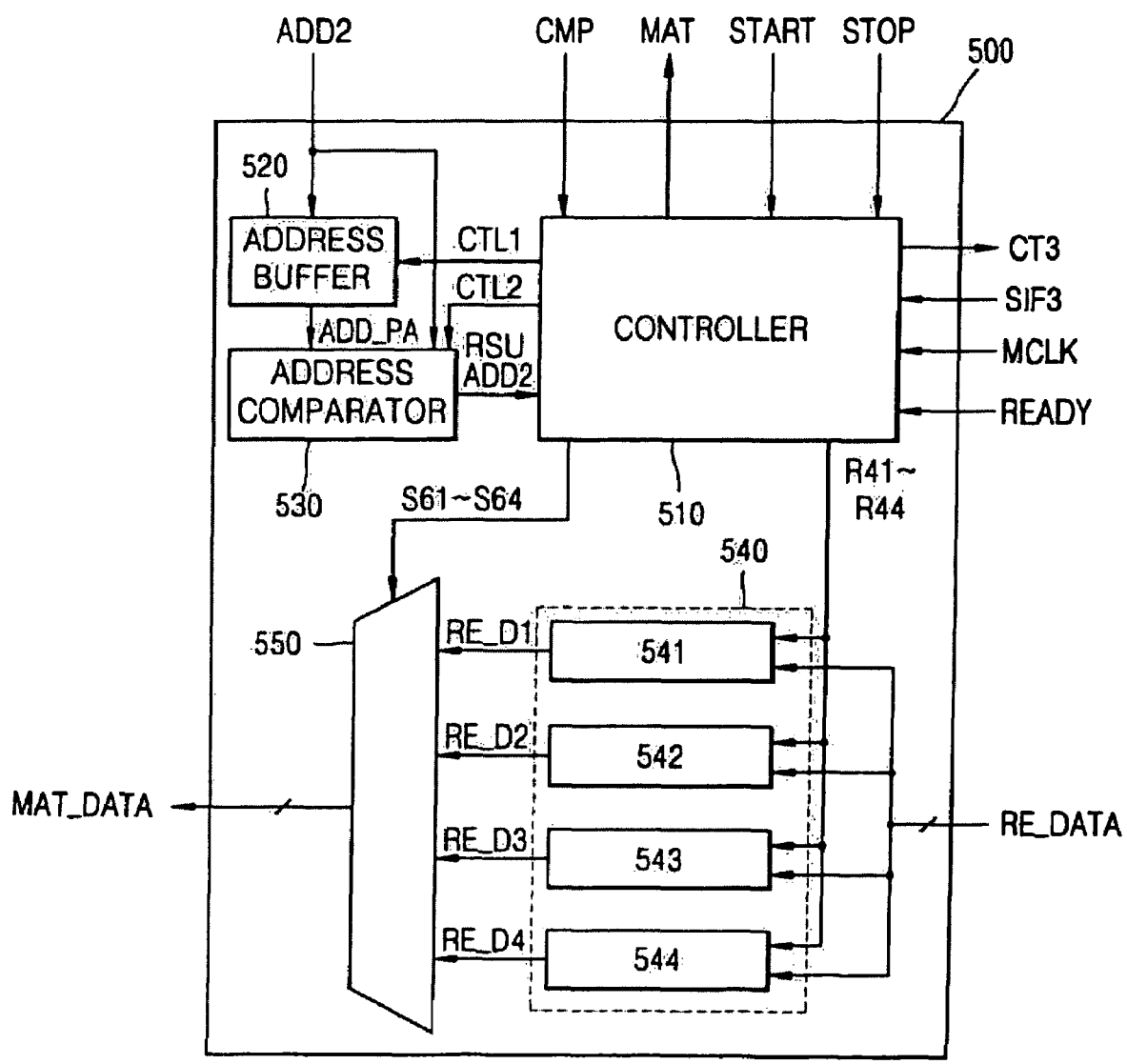
FIG. 6 is a view of an exemplary embodiment of the pre-fetch unit of FIG. 2.

FIG. 6 is a view of an exemplary embodiment of the pre-fetch unit 500 of FIG. 2 according to the present invention. Referring to FIG. 6, an exemplary embodiment of the pre-fetch unit 500 may include a controller 510, an address buffer 520, an address comparator 530, a data buffer 540, and a multiplexer 550. The controller 510 may output an address buffer control signal CTL1, for example, in response to a pre-fetch start signal START, which may be received from the data reading unit 300. The controller 510 may enable data buffer control signals R41 through R44, for example, one by one when the transmission ready signal READY is received from the serial interface 400. The controller 510 may disable all, or substantially all, of the data buffer control signals R41 through R44, for example, when a pre-fetch stop signal STOP is received from the data reading unit 300.

The controller 510 may output a comparison control signal CTL2 to the address comparator 530, for example, when the address comparison signal CMP is received from the data reading unit 300. The controller 510 may enable or disable the selection control signals S61 through S64, for example, in response to a comparison result signal RSU and/or the current read address signal ADD_CR, which may be received from the address comparator 530. The controller 510 may output the matching signal MAT to the data reading unit 300, for example, in response to the comparison result signal RSU.

The address buffer 520 may store the read address signal ADD2, which may be received from the bus 12, for example, when the address buffer control signal CTL1 is enabled. The address buffer 520 may output the stored read address signal ADD2, for example, as a reference address signal ADD_PA when the address buffer control signal CTL1 is disabled. The reference address signal ADD_PA may be the first read address signal the pre-fetch unit 500 receives.

The address comparator 530 may receive the reference address signal ADD_PA from the address buffer 520 and the read address signal ADD2 from the bus 12, for example, when the comparison control signal CTL2 is enabled. The address comparator 530 may calculate an address range of a data signal RE_DATA, which may be stored in the data buffer 540, from the reference address signal ADD_PA. For example, the 100 data signals RE_DATAs may be stored at the data buffer 540, and the reference address signal ADD_PA may be 100. The address range of the data signal RE_DATA (i.e., the address range of the data buffer 540), which may be stored at the data buffer 540 may be 100-200.

The address comparator 530 may determine whether the currently received read address signal ADD2 from the bus 12 may be included in the 100-200 address range of the data buffer 540. The address comparator 530 may output the comparison result signal RSU and the read address signal ADD2 to the controller 510, for example, according to the determination result. The address comparator 530 may enable the comparison result signal RSU, for example, when the read address signal ADD2 is included within the address range of the data buffer 540, and may disable the comparison result signal RSU, for example, when the read address signal ADD2 is not included within the address range of the data buffer 540.

In exemplary embodiments of the present invention, the data buffer 540 may include data buffers 541 through 544, but may further include additional data buffers. The data buffers 541 through 544 may store the data signal RE_DATA, which may be received from the serial interface 400, for example, when the data buffer control signals R41 through R44 are enabled. The data buffers 541 through 544 may store (e.g., successively store) the data signal RE_DATA, for example, when the data buffer control signals R41 through R44 are enabled (e.g., successively enabled). The data buffers 541 through 544 may output the stored data signal RE_DATA, for example, when the data buffer control signals R41 through R44 are disabled. The data signals RE_DATAs, which may be output from the data buffers 541 through 544 will be described as $RE\_D_1$ through $RE\_D_4$, respectively. The data signals $RE\_D_1$ through $RE\_D_4$ may be input (e.g., continuously input) to the pre-fetch unit 500 from the serial interface 400. The multiplexer 550 may select at least one of the data signals $RE\_D_1$ through $RE\_D_4$ and may output the selected data signal to the data reading unit 300, for example, as the matching data signal MAT_DATA in response to the selection control signals S61 through S64.

The controller 510 may enable the address buffer control signal CTL1 and may disable the address buffer control signal CTL1, for example, when the pre-fetch start signal START is received from the data reading unit 300. The address buffer 520 may store the currently received read address signal ADD2 and may output the stored read address signal ADD2, for example, as the reference address signal ADD_PA in response to the address buffer control signal CTL1.

The controller 510 may enable (e.g., sequentially enable) the data buffer control signals R41 through R44, for example, when the transmission ready signal READY is received. The data buffers 541 through 544 may receive and store (e.g., successively receive and store) the data signal RE_DATA, for example, in response to the data buffer control signals R41 through R44. The controller 510 may disable all, or substantially all, of the data buffer control signals R41 through R44, for example, when the pre-fetch stop signal STOP is received from the data reading unit 300.

The controller 510 may enable the comparison control signal CTL2, for example, when the address comparison signal CMP is received from the data reading unit 300. The address comparator 530 may calculate the address range of the data buffer 540 from the reference address signal ADD_PA, which may be received from the address buffer 520, for example, in response to the comparison control signal CTL2. The address comparator 530 may determine whether the read address signal ADD2 currently received through the bus 12 may be included in the address range of the data buffer 540. The address comparator 530 may enable the comparison result signal RSU and may output the read address signal ADD2 to the controller 510, for example, when the read address signal ADD2 is included in the address range of the data buffer 540. The controller 510 may enable the matching signal MAT and may output the matching signal MAT to the data reading unit 300, for example, in response to the comparison result signal RSU, and may enable at least one of the selection control signals S61 through S64, for example, in response to the read address signal ADD2.

The multiplexer 550 may select at least one of the data signals RE_D1 through RE_D4, which may be received from the data buffers 541 through 544, and may output the selected data signal to the data reading unit 300, for example, as the matching data signal MAT_DATA in response to at least one of the selection control signals S61 through S64, which may be enabled.

The address comparator 530 may disable the comparison result signal RSU, for example, when the read data signal ADD2 is not included in the address range of the data buffer 540. The controller 510 may disable the matching signal MAT and may transmit the matching signal MAT to the data reading unit 300, for example, when the comparison result signal RSU is disabled.

The memory controller (e.g., the serial flash memory controller) 11 may store the read address signal ADD2, which may be received from the bus 12 at a higher speed using the address register 320, and the time the bus 12 may be utilized by the memory controller 11 may be reduced. The memory controller 11 according to an exemplary embodiment of the present invention may reduce the data reading time of the memory 20, for example, by storing the data signal RE_DATA from the memory 20 in advance through the pre-fetch unit 500.

Figure 7:
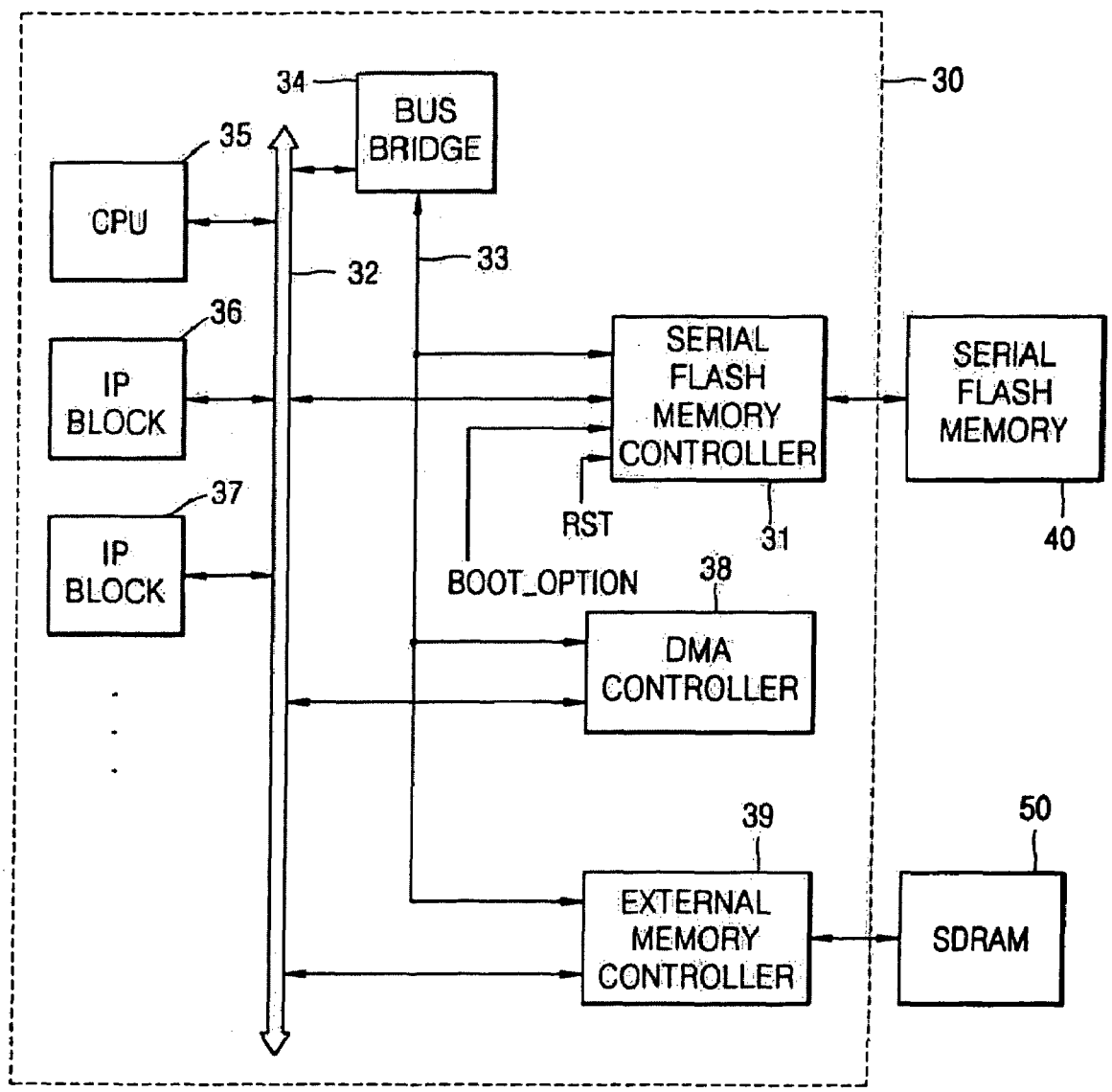
FIG. 7 is a block diagram of another exemplary embodiment of an SOC, which may include a memory controller and a memory, according to the present invention.

FIG. 7 is a block diagram of an exemplary embodiment of the system 30 with applied memory controller and a memory (e.g., serial flash memory) 40 according to the present invention. Referring to FIG. 7, the system 30 may include a memory controller (e.g., serial flash memory controller) 31, a bus bridge 34, a CPU 35, IP blocks 36 and 37, a controller (e.g., a direct memory access (DMA) controller) 38, and a controller (e.g., an external memory controller) 39. The system 30 may further include additional IP blocks. The memory controller 31, the CPU 35, the IP blocks 36 and 37, the controller 38, and the controller 39 may be connected to, and communicate through, a bus (e.g., a memory bus) 32. The memory controller 31 may be further connected to the memory 40, and the controller 39 may be further connected to a memory (e.g., an external synchronous dynamic random access memory (SDRAM)) 50.

Data stored at the memory 40 may be written in a memory device, for example, the memory 50 or data stored at the memory 50 may be written in the memory 40. The CPU 35 may read the data from the memory 40 and may write the read data in the memory 50. As shown in FIG. 7, the controller 38 included in the system 30, may read (e.g., automatically read) the data stored at the memory 40 and may write the read data in a memory device such as the memory 50.

Figure 8:
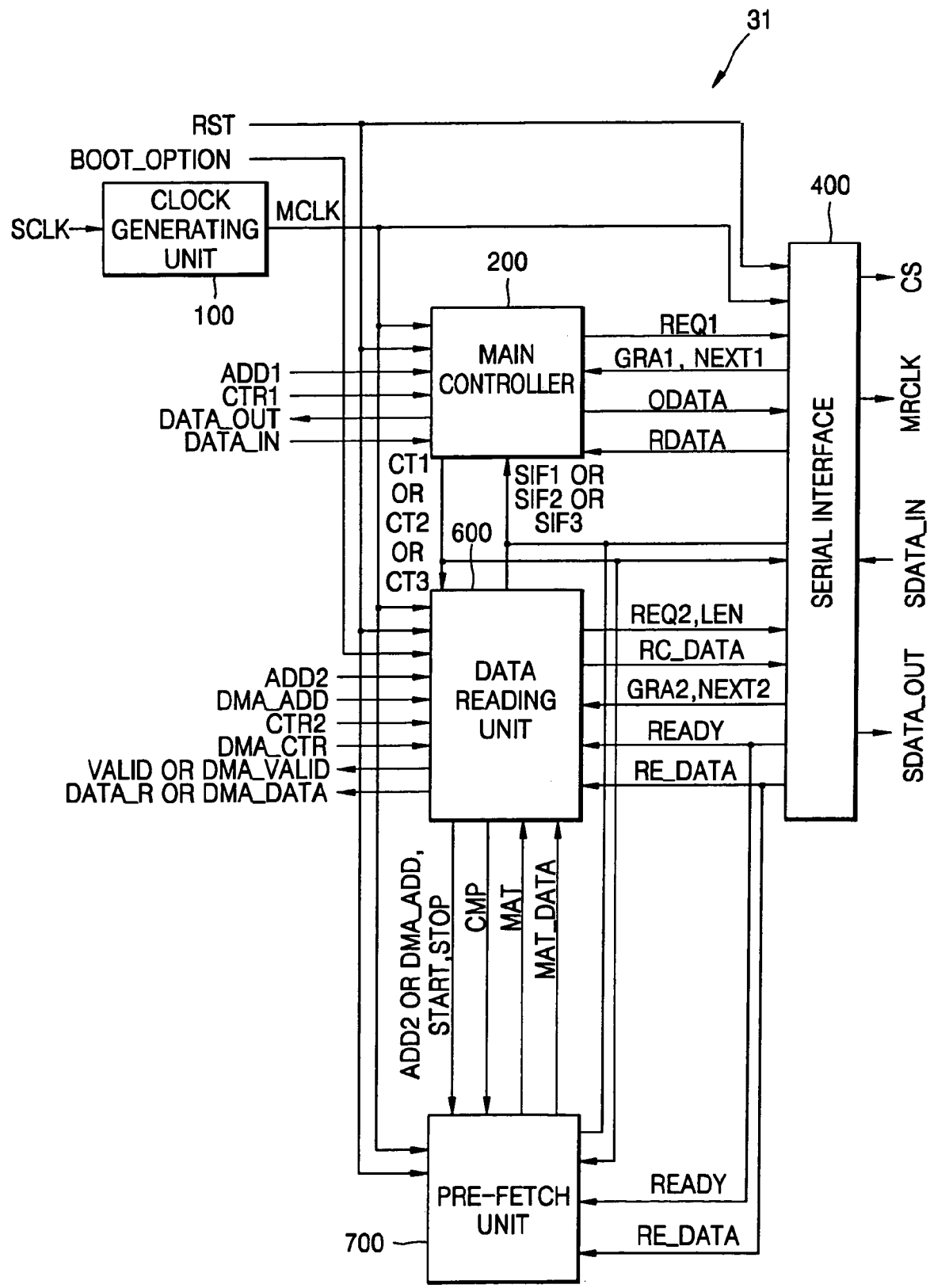
FIG. 8 is a block diagram of another exemplary embodiment the memory controller of FIG. 7.

FIG. 8 is a block diagram of the controller (e.g., the serial flash memory controller) 31 of FIG. 7 according to an exemplary embodiment of the present invention. Referring to FIG. 8, the memory controller 31 may include a clock generator 100, a main controller 200, a serial interface 400, a data reading unit 600, and a pre-fetch unit 700.

The data reading unit 600 may be similar, or substantially similar, to the data reading unit 300 of FIG. 2 and may receive a transmission control signal (e.g., a DMA transmission control signal) DMA_CTR and an address signal (e.g., a DMA address signal) DMA_ADD from the DMA controller 38 through the bus 32. The data reading unit 600 may enable a valid signal (e.g., a DMA valid signal) DMA_VALID, for example, when a number of transmission ready signals READYs are received from the serial interface 400.

The pre-fetch unit 700 may be similar, or substantially similar, to the pre-fetch unit 500 of FIG. 2, and may receive at least one of a read address signal ADD2 and the address signal DMA_ADD from the data reading unit 600.

Figure 9:
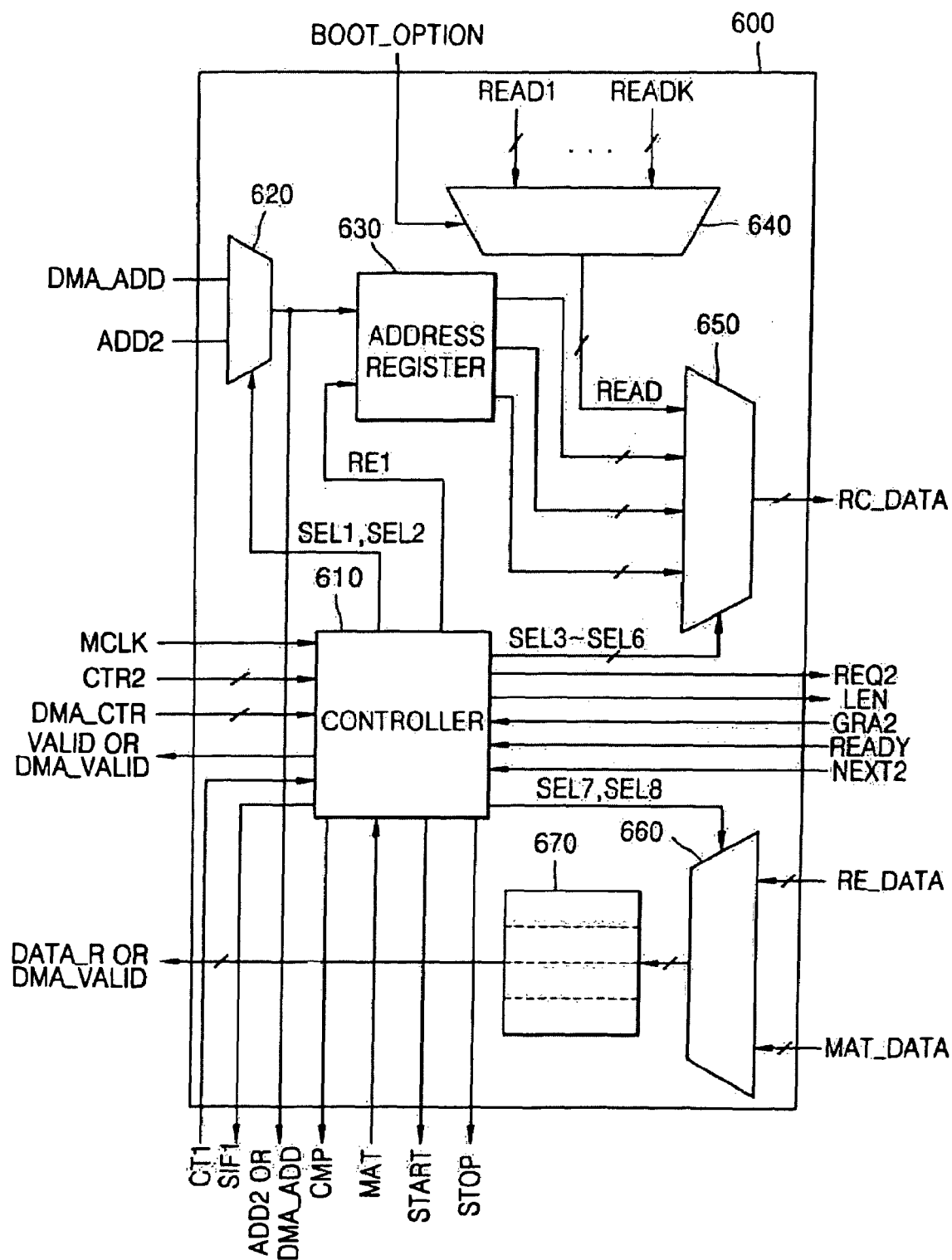
FIG. 9 is a view of another exemplary embodiment of the data reading unit of FIG. 8.

FIG. 9 illustrates an exemplary embodiment of the data reading unit 600 of FIG. 8 according to the present invention. The data reading unit 600 may include a controller 610, a multiplexer 620, an address register 630, a multiplexer 640, a multiplexer 650, a multiplexer 660, and a data buffer 670.

The operation of the controller 610 may be similar to the controller 310 of FIG. 4 but controller 610 may further receive the transmission control signal DMA_CTR from the controller 38 through the bus 32. The controller 610 may enable a selection control signal SEL1, for example, in response to the transmission control signal DMA_CTR and may enable a selection control signal SEL2, for example, in response to a transmission request signal CTR2.

The controller 610 may receive the transmission control signal CTR2 and the controller 610 may output a valid signal VALID to the bus 32, for example, when a number of transmission ready signals READYs are received from the serial interface 400.

The multiplexer 620 may select the DMA read address signal DMA_ADD received from the bus (e.g., memory bus) 32 and may output the DMA read address signal DMA_ADD to the address register 630 and the pre-fetch unit 700, for example, when the selection control signal SELL is enabled. The multiplexer 620 may select the read address signal ADD2 received from the bus 32 and may output the read address signal ADD2 to the address register 630 and the pre-fetch unit 700, for example, when the selection control signal SEL2 is enabled.

The operation of the address register 630, the multiplexers 640 through 660, and the data buffer 670 may be the same, or substantially the same, as those of the address register 320, the multiplexers 330 through 350, and the data buffer 360, respectively.

The controller 610 may output a transmission request signal REQ2 to the serial interface 400 and may enable a register control signal RE1 in response to at least one of the transmission control signal CTR2 and the DMA transmission control signal DMA_CTR received through the bus 32. The controller 610 may enable the selection control signal SEL1, for example, when the DMA transmission control signal DMA_CTR is received, and may enable the selection control signal SEL2, for example, when the transmission control signal CTR2 is received.

The transmission control signal CTR2 may be received by the data reading unit 600 and the data reading unit 300 may operate in the same, or substantially the same, manner as the data reading unit 300 of FIG. 4. The multiplexer 620 may output the DMA address signal DMA_ADD received through the bus 32 to the address register 630 and the pre-fetch unit 700 in response to the selection control signal SEL1. The address register 630 may store the DMA address signal DMA_ADD in response to the register control signal RE1. The operation of the data reading until 600 may be the same, or substantially the same, as when the controller 610 receives the transmission control signal CTR2.

Figure 10:
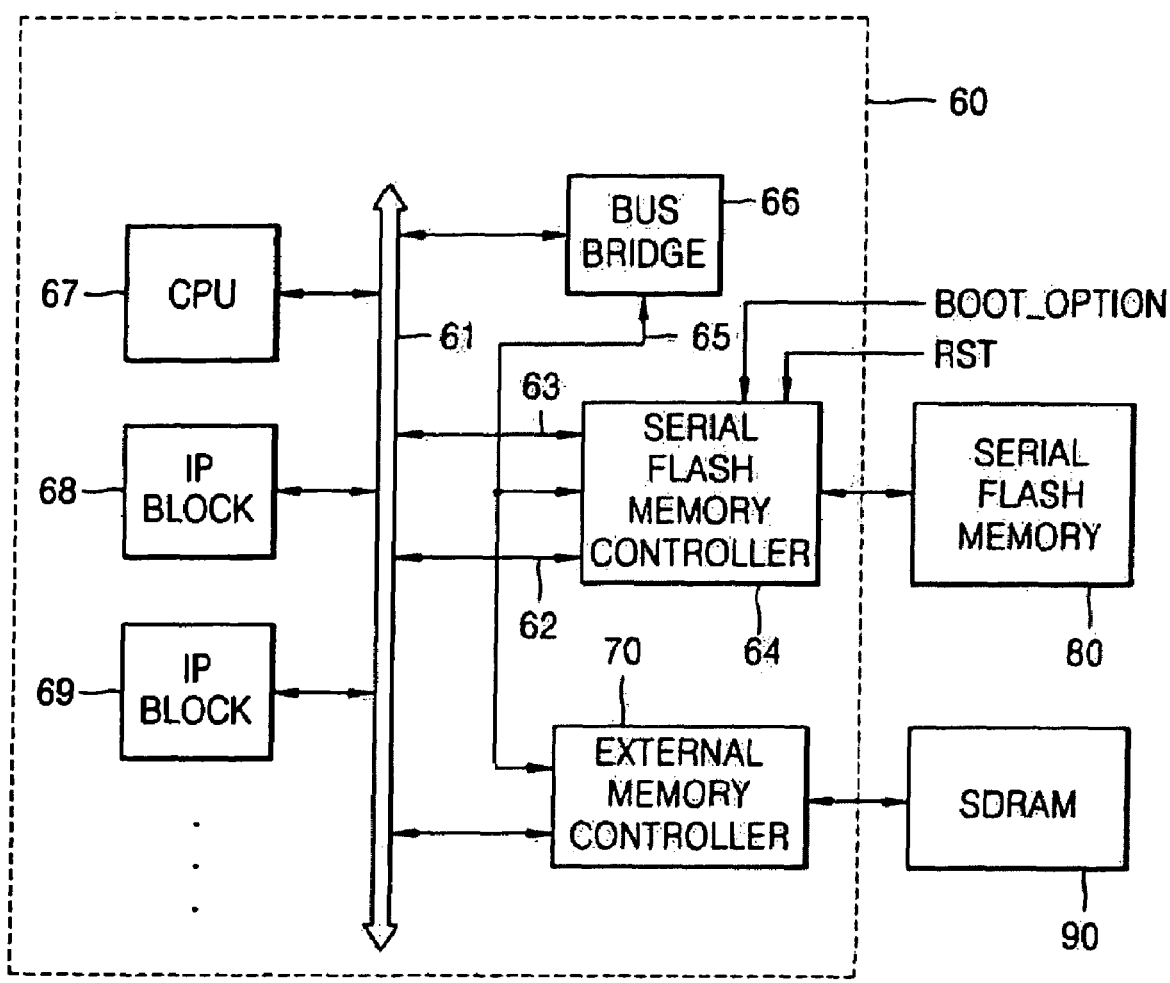
FIG. 10 is a block diagram of another exemplary embodiment of an SOC, which may include a memory controller and a memory according to the present invention.

FIG. 10 is a block diagram of another exemplary embodiment of the system, which may use a memory controller (e.g., a serial flash memory controller) 64 and a memory (e.g., a serial flash memory) 80 according to another exemplary embodiment of the present invention. The system 60 may include a memory controller 64, a bus bridge 66, a processor 67, IP blocks 68 and 69, and an external memory controller 70. The system 60 may further include additional IP blocks. The memory controller 64, the processor 67, the IP blocks 68 and 69, and the external memory controller 70 may be connected to a bus (e.g., a memory bus) 61 and may communicate with one another through the bus 61. The memory controller 64 may be further connected to a memory 80, and the external memory controller 70 may be further connected to an external memory (e.g., an external synchronous random access memory (SDRAM) or static random access memory (SRAM)) 90. The operation of the system 60 may be similar, or substantially similar, to the operation of the system 30 of FIG. 7. However, the memory controller 64 may include a DMA function. The memory controller 64 may be connected to the bus 61 through a bus (e.g., a master bus) 62 and a bus (e.g., a slave bus) 63.

Figure 11:
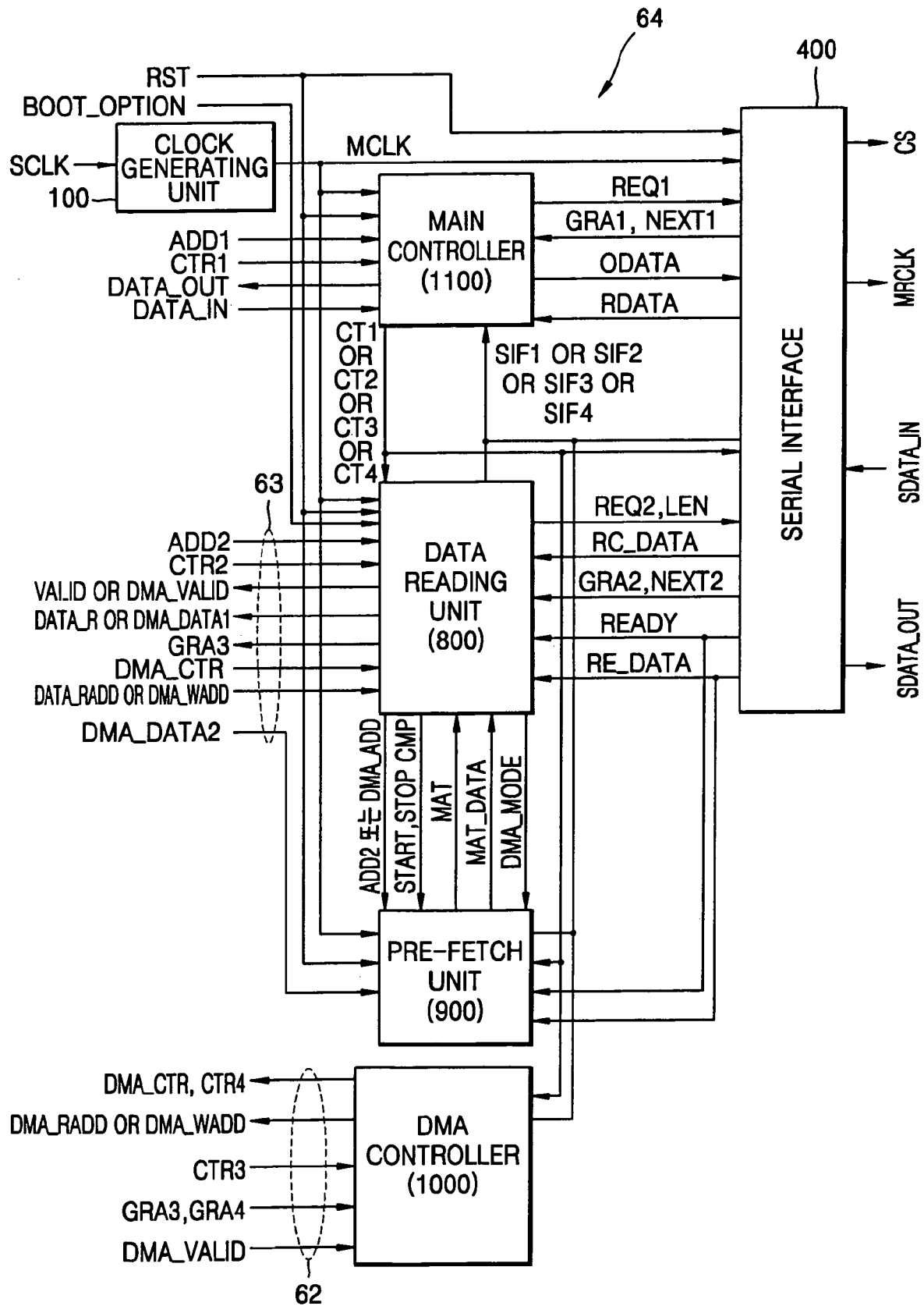
FIG. 11 is a block diagram of another exemplary embodiment of the memory controller of FIG. 10.

FIG. 11 is a block diagram of another exemplary embodiment of the memory controller of FIG. 10. Referring to FIG. 11, the memory controller 64 may include a clock generator 100, a serial interface 400, a data reading unit 800, a pre-fetch unit 900, a DMA controller 1000, and a main controller 1100. The structures and operations of the clock generator 100, the serial interface 400 may be the same, or substantially the same, as those of FIG. 8.

The data reading unit 800 may be connected to the bus 61 through the bus 63. The operation of the data reading unit 800 may be similar, or substantially the similar, as the operation of the data reading unit 600 of FIG. 8.

However, the data reading units 800 may output a third transmission granting signal GRA3 to the DMA controller 1000 through the bus 61 a DMA mode signal DMA_MODE to the pre-fetch unit 900. The data reading unit 800 may output the DMA mode signal DMA_MODE to the pre-fetch unit 900, for example, when a DMA transmission control signal DMA_CTR is received from the DMA controller 1000, and the pre-fetch unit 900 may operate in a DMA mode.

The DMA controller 1000 may be connected to the bus 61 through the bus 62. The DMA controller 1000 may transmit the DMA transmission control signal DMA_CTR to the data reading unit 800 through the bus 61, for example, in response to a transmission control signal CTR3 received from the processor (e.g., CPU) 67 through the bus 61. The DMA controller 1000 may transmit the DMA read address signal DMA_RADD to the data reading unit 800 through the bus 61, for example, if a transmission granting signal GRA3 is received from the data reading unit 800. The DMA controller 1000 may transmit a transmission control signal CTR4 to the external memory controller 70 through the bus 61, for example, if a DMA valid signal DMA_VALID is received from the data reading unit 800.

The DMA controller 1000 may transmit a DMA write address signal DMA_WADD to the external memory controller 70, for example, if a transmission granting signal GRA4 is received from the external memory controller 70. The data reading unit 800 may output a DMA data signal DMA_DATA1 to the external memory controller 70 through the bus 61.

The DMA controller 1000 may transmit the DMA transmission control signal DMA_CTR to the data reading unit 800 through the bus 61, for example, in response to a transmission control signal CTR3 received from the processor 67 through the bus 61. The DMA controller 1000 may transmit a transmission control signal CTR4 and the DMA read address signal DMA_RADD to the external memory controller 70. The external memory controller 70 may read a DMA data signal DMA_DATA2 from the SDRAM 90 and may transmit the DMA data signal DMA_DATA2 to the bus 61 in response to the DMA read address signal DMA_RADD.

The DMA controller 1000 may transmit the DMA write address signal DMA_WADD to the data reading unit 800 through the bus 61, for example, if a transmission granting signal GRA3 is received from the data reading unit 800. The pre-fetch unit 900 may store the DMA data signal DMA_DATA2 received from the external memory controller 70 through the bus 61.

The DMA controller 1000 may share a data buffer 950 (see FIG. 13) of the pre-fetch unit 900. The pre-fetch unit 900 may receive the DMA data signal DMA_DATA2 through the bus 61, for example, when in a DMA mode. The pre-fetch unit 900 may be in the DMA mode and the data buffer 950 of the pre-fetch unit 900 may be used as a data buffer for the DMA controller 1000. The DMA controller 1000 need not include additional data buffers.

The main controller 1100 may be similar, or substantially similar, to the main controller 200 of FIG. 3. However, the main controller 1100 may generate and transmit a status control signal CT4 to the DMA controller 1000 based on a control data signal DATA_IN. The status control signal CT4 may requests a current operation status information of the DMA controller 1000 or instruct the DMA controller 1000 to perform an operation. The DMA controller 1000 may transmit a status information signal SIF4 to the main controller 1100 in response to the status control signal CT4.

Figure 12:
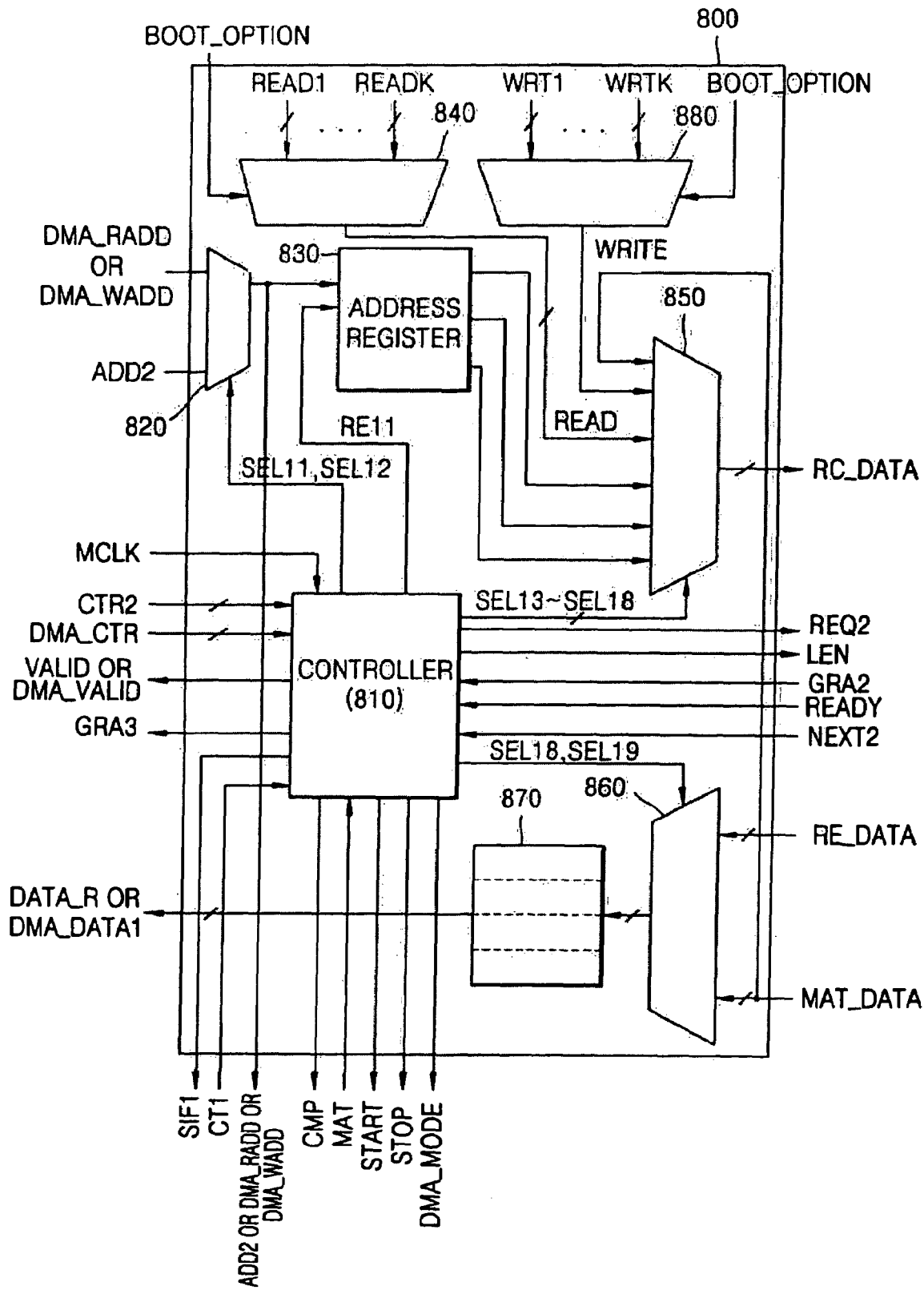
FIG. 12 is view of another exemplary embodiment of the reading unit data reading unit of FIG. 11.

FIG. 12 illustrates another exemplary embodiment of the data reading unit 800 of FIG. 11. Referring to FIG. 12, the data reading unit 800 may include a controller 810, a multiplexer 820, an address register 830, a multiplexer 840, a multiplexer 850, a multiplexer 860, a data buffer 870, and a multiplexer 880.

The controller 810 may be the same, or substantially the same, as the controller 600 of FIG. 9. However, the controller 810 may transmit a transmission granting signal GRA3 to the DMA controller 1000 and may output a DMA mode signal DMA_MODE to the pre-fetch unit 900, for example, in response to a DMA transmission control signal DMA_CTR.

The multiplexer 820, the address register 830, the multiplexers 840 and 860, and the data buffer 870 may be the same, or substantially the same, as the multiplexer 620, the address register 630, the multiplexers 640 and 660, and the data buffer 670 of FIG. 9, respectively.

The multiplexer 880 may select at least one of command signals WRT1 through WRTK, where K may be an integer, and may output the selected command signal to the multiplexer 850, for example, as a write command signal WRITE in response to a command selection signal BOOT_OPTION, which may be received from an external device. The multiplexer 880 may hold an output of the write command signal WRITE until a write operation of the memory 80 may be completed. Each of the command signals WRT1 through WRTK may include a plurality of bits and may be generated by, for example, separate command signal generating circuits. The command signals WRT1 through WRTK may have different bit values. The command selection signal BOOT_OPTION may change according to the type of memory 80. The multiplexer 880 may output the write command signal WRITE in a form, which may correspond to the type of memory 80.

The multiplexer 850 may be similar to the multiplexer 650 of FIG. 9 but the multiplexer 850 may further receive a matching data signal MAT_DATA from the pre-fetch unit 900 and the write command signal WRITE from the multiplexer 880.

The controller 810 may receive the DMA transmission control signal DMA_CTR as depicted by way of example with reference to FIG. 12. During data reading and writing processes by the DMA controller 1000, the controller 810 may receive the DMA transmission control signal DMA_CTR, for example, from the DMA controller 1000.

During the reading process of data of the memory 80 by the DMA controller 1000, the controller 810 may enable the DMA mode signal DMA_MODE and may transmit a transmission request signal REQ2 to the serial interface 400, for example, in response to the DMA transmission control signal DMA_CTR, which may be received from the DMA controller 1000, for example, through the bus (e.g., the memory bus) 61 and the bus (e.g., the slave bus) 63. The controller 810 may enable a selection control signal SEL11 and a register control signal RE11, and may transmit a transmission granting signal GRA3 to the DMA controller 1000, for example, through the bus 61. The multiplexer 320 may output a DMA read address signal DMA_RADD, which may be received from the DMA controller 1000, for example, in response to the selection control signal SEL11.

The address register 830 may store the DMA read address signal DMA_RADD, for example, in response to the register control signal RE11. When a transmission granting signal GRA2 is received from the serial interface 400, the controller 810 may transmit data length information LEN to the serial interface 400. The controller 810 may disable the register control signal RE11 and may enable (e.g., successively enable) selection control signals SEL 13 through SEL 16, for example, in response to a memory clock signal MCLK.

The address register 830 may divide the stored DMA read address signal DMA_RADD into a number of bits and may output them as read address signals RADD1 through RADD3, for example, in response to the register control signal RE11.

The second multiplexer 840 may select at least one of command signals READ1 through READK and may output the selected command signal, for example, as a read command signal READ in response to a command selection signal BOOT_OPTION, which may be received from an external device.

The multiplexer 850 may select (e.g., successively select) the read command signal READ and the read address signals RADD1 through RADD3 and may output them to the serial interface 400, for example, as a command data signal RC_DATA in response to the selection control signals SEL13 through SEL16.

During the operation of the data reading unit 800 during the writing process of data of the memory 80 by the DMA controller 1000, the controller 810 may enable the DMA mode signal DMA_MODE and may transmit the transmission request signal REQ2 to the serial interface 400, for example, in response to the transmission control signal DMA_CTR, which may be received from the DMA controller 1000 through the bus 61 and the bus 63. The controller 810 may enable the selection control signal SEL11 and the register control signal RE11 and may transmit the transmission granting signal GRA3 to the DMA controller 1000. The multiplexer 820 may output a DMA write address signal DMA_WADD received from the DMA controller 1000, for example, in response to the selection control signal SEL11.

The address register 830 may stores the DMA write address signal DMA_WADD, for example, in response to the register control signal SEL11. When a transmission granting signal GRA2 is received from the serial interface 400, the controller 810 may disable the register control signal RE11 and may enable (e.g., sequentially enable) selection control signals SEL17, SEL14 through SEL16, and SEL18.

The address register 830 may divide the stored DMA write address signal DMA_WADD into a number of bits and may outputs them as write address signals WADD1 through WADD3, for example, in response to the register control signal RE11.

The multiplexer 880 may select at least one of command signals WRT1 through WRTK and may output the selected command signal as a write command signal WRITE, for example, in response to a command selection signal BOOT_OPTION, which may be received from an external device.

The multiplexer 850 may select (e.g., successively select) the write command signal WRITE and the write address signals WADD1 through WADD3 and may output them to the serial interface 400, for example, as a command data signal RC_DATA in response to the selection control signals SEL17, and SEL14 through SEL16. The multiplexer 850 may respond to the selection control signal SEL18, and may output a matching data signal MAT_DATA, which may be received from the pre-fetch unit 900, to the serial interface 400, for example, as the command data signal RC_DATA. The matching data signal MAT_DATA may be a DMA write data signal received from the external memory controller 70, for example, through the bus 61 and the bus 63.

Figure 13:
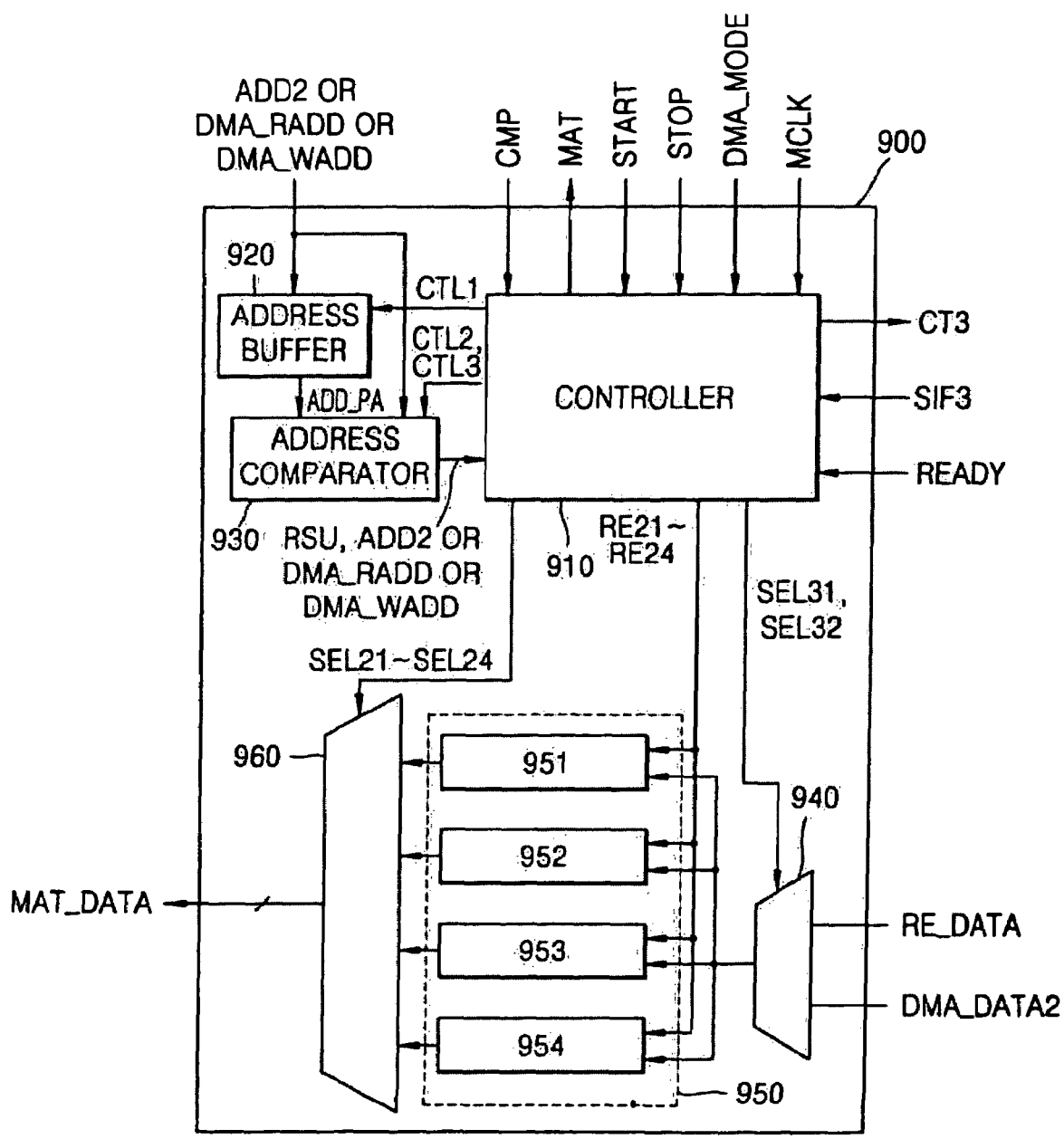
FIG. 13 is a view of another exemplary embodiment of the pre-fetch unit of FIG. 11.

FIG. 13 illustrates an exemplary embodiment of the pre-fetch unit 900 of FIG. 11 according to the present invention. The pre-fetch unit 900 may include a controller 910, an address buffer 920, an address comparator 930, a multiplexer 940, the data buffer 950, and a multiplexer 960. The operation of the controller 910 may be similar, or substantially similar, to the operation of the controller 510 of FIG. 6 and the controller 910 may further output selection control signals SEL31 and SEL32 and a mode control signal CTL3 in response to the DMA mode signal DMA_MODE. The controller 910 may enable the selection control signal SEL32, for example, when the DMA mode signal DMA_MODE is enabled, and may enable the selection control signal SEL31, for example, when the DMA mode signal DMA_MODE is disabled. The controller 910 may enable the mode control signal CTL3, for example, when the DMA mode signal DMA_MODE is enabled and an address comparison signal CMP is received from the data reading unit 800.

The operations of the address buffer 920, the address comparator 930, the data buffer 950, and the multiplexer 960 may be similar, or substantially similar, to the operation of the address buffer 520, the address comparator 530, the data buffer 540, and the multiplexer 550, respectively, apart from the address comparator 930, which may not perform an address comparison operation, for example, when the mode control signal CTL3 is enabled, and may output the currently received DMA read address signal DMA_RADD to the controller 910. The address comparator 930 may enable a comparison result signal RSU, for example, when the mode control signal CTL3 is enabled. The address comparator 930 may hold the enabled state of the comparison result signal RSU, for example, until the mode control signal CTL3 is disabled.

The multiplexer 940 may output a data signal RE_DATA received from the serial interface 400, for example, when the selection control signal SEL31 is enabled. The multiplexer 940 may output a DMA data signal DMA_DATA2 received from the memory controller (e.g., the external memory controller) 70 through the bus 61, for example, when the selection control signal SEL32 is enabled.

An exemplary embodiment of the pre-fetch unit 900 according to the present invention, which may operate in a DMA mode, will be described as illustrated in FIG. 13.

In a DMA reading process of the memory 80, the controller 910 may receive a DMA mode signal DMA_MODE and an address comparison signal CMP from the data reading unit 800. When the DMA mode signal DMA_MODE is enabled, the pre-fetch unit 900 may operate in the DMA mode. The data buffer 950 of the pre-fetch unit 900 may be used as the data buffer for the DMA controller 1000.

The controller 910 may enable the mode control signal CTL3, for example, in response to the DMA mode signal DMA_MODE and the address comparison signal CMP, and may enable the selection control signal SEL31.

The data reading unit 800 may transmit a command data signal RC_DATA, which may be generated based on a DMA read address signal DMA_RADD, which may be received from the DMA controller 1000, to the memory 80, for example, through the serial interface 400. A data signal RE_DATA from the memory 80 through the serial interface 400 may be input to the pre-fetch unit 900.

The controller 910 may enable (e.g., successively enable) the data buffer control signals RE21 through RE24, for example, one by one when a transmission ready signal READY is received from the serial interface 400. Data buffers 951 through 954 may store (e.g., successively store) the data signal RE_DATA, for example, in response to the data buffer control signals RE21 through RE24. The data signal RE_DATA, which may be stored at the data buffers 951 through 954 may be RE_D1 through RE_D4. The data signals RE_D$_1$ through RE_D4 may be input (e.g., continuously input) to the pre-fetch unit 900.

The address comparator 930 may enable the comparison result signal RSU and may output a DMA read address signal DMA_RADD, which may be received by the controller 910, for example, in response to the mode control signal CTL3. The controller 910 may enable and may output a matching signal MAT to the data reading unit 800, for example, in response to the comparison result signal RSU. The controller 910 may enable (e.g., successively enable) the selection control signals SEL21 through SEL24 and may disable (e.g., successively disable) the data buffer control signals RE21 through RE24, for example, in response to the DMA read address signal DMA_RADD. The data buffers 951 through 954 may output the read data signals RE_D1 through RE_D4, which may be stored (e.g., stored successively). The multiplexer 960 may select (e.g., sequentially select) the read data signals RE_D$_1$ through RE_D4 and may output them to the data reading unit 800, for example, as a matching data signal MAT_DATA in response to the selection control signals SEL21 through SEL 24.

In a DMA writing process of the memory 80, the controller 910 may receive a DMA mode signal DMA_MODE from the data reading unit 800. The controller 910 may enable the selection control signal SEL32 if the address comparison signal CMP is not received, for example, when the DMA mode signal DMA_MODE is enabled. The controller 910 may enable (e.g., sequentially enable) the data buffer control signals RE21 through RE24. The multiplexer 940 may output a DMA data signal DMA_DATA2, which may be received (e.g., continuously received) from the controller 70, for example, through the bus 61 in response to the selection control signal SEL32. The data buffers 951 through 954 may store (e.g., sequentially store) the DMA data signals DMA_DATA2, for example, in response to the data buffer control signals RE21 through RE24. The DMA data signal RE_DATA2, which may be stored at the data buffers 951 through 954, may be DMA_D1 through DMA_D4. The DMA data signals DMA_D1 through DMA_D4 may be input (e.g., continuously input) to the pre-fetch unit 900.

The controller 910 may enable (e.g., successively enable) the selection control signals SEL21 through SEL24, and may disable (e.g., successively disable) the data buffer control signals RE21 through RE24. The data buffers 951 through 954 may output the stored (e.g., successively stored) DMA data signals DMA_D1 through DMA_D4. The multiplexer 960 may select (e.g., sequentially select) the DMA data signals DMA_D1 through DMA_D4 and may output them to the data reading unit 800 as a matching data signal MAT_DATA, for example, in response to the selection control signals SEL21 through SEL24.

As described above, a controller (e.g., a serial flash memory controller) according to exemplary embodiments of the present invention may reduce a possession time of a bus (e.g., a memory bus), for example, by controlling a reading and/or writing operations of a memory (e.g., serial flash memory) more efficiently.

Although exemplary embodiments of the present invention have been described with regard to systems-on-chip, it will be understood that exemplary embodiments may be utilized in any suitable system.

Although exemplary embodiments of the present invention have been described with regard to serial flash memory, synchronous dynamic random access memory (SDRAM), and static random access memory (SRAM), it will be understood that any suitable memory, or combination of memories, may be used in connection with exemplary embodiments of the present invention.

Although exemplary embodiments of the present invention have been described with regard to read address signals of 8-bits, it will be understood that the any of the signals as discussed herein may be comprised of any suitable number of bits. For example, 8 bits, 16 bits, etc., or combination thereof.

Although exemplary embodiments of the present invention have been described with regard to intellectual property blocks, it will be understood that the intellectual property blocks may also be any suitable type of macro block.

Although exemplary embodiments of the present invention have been described with regard to internal and external memories, it will be understood that the various memories as described above, may be internal, external, or any combination thereof.

Although exemplary embodiments of the present invention have been described with regard to direct memory access operations, it will be understood that exemplary embodiments of the present invention may be utilized in connection with any suitable memory operations.

Although exemplary embodiments have been described with regard to the components illustrated in the figures corresponding thereto, for example, the main controller 200 implemented in the memory controller 11, it will be understood that similar components (e.g., main controller 200 and main controller 1100) may be interchangeable. For example, the main controller 1100 may be implemented in the memory controller 11.

While exemplary embodiments of the present invention have been particularly shown and described, it will be understood by those of ordinary skill in the art that various changes in form and details may be made therein without departing from the spirit and scope of the present invention as defined by the following claims.

What is claimed is:

1. A memory controller comprising:
a main controller configured to store a control data signal received from a processor through a first bus, and control a memory by generating a request data signal based on the stored control data signal;
a data reading unit separate from the main controller, configured to store read address signals received from at least one of the processor and IP blocks through a second bus separate from the first bus, and read data from the memory by generating command data signals based on the read address signals;
an interface configured to interface at least one of the main controller and the data reading unit with the memory;
a controller configured to output a register control signal and a transmission request signal to the interface in response to a transmission control signal received through the second bus, and output first selection control signals when a transmission granting signal is received from the interface;
an address register configured to store the read address signals received through the second bus and output the read address signals in response to the register control signal;
a first multiplexer configured to select at least one of a plurality of command signals and output the at least one selected command signal as a read command signal in response to an external command selection signal, and
a second multiplexer configured to select the read command signal and the read address signals sequentially, and output the read command signal and the read address signal as the command data signal in response to the first selection control signals.

2. The memory controller of claim 1, wherein the control data signal is a command signal.

3. The memory controller of claim 1, wherein the data reading unit is configured to generate a pre-fetch start signal and a pre-fetch stop signal sequentially when at least one of the read address signals is received.

4. The memory controller of claim 1, further including a pre-fetch unit configured to receive at least one of the read address signals, pre-fetch and store read data signals received from the memory through the interface in response to a pre-fetch start signal, and stops the storing operation of the read data signals in response to a pre-fetch stop signal.

5. The memory controller of claim 4, wherein:
the data reading unit is configured to generate an address comparison signal when at least one of the read address signals is received, and
the pre-fetch unit is configured to output a matching data signal with a matching signal to the data reading unit when the matching data signal, which corresponds to at least one of the read address signals, exists, the matching data signal being output in response to the address comparison signal.

6. The memory controller of claim 1, wherein the data reading unit is configured to receive direct memory access address signals from a direct memory access controller through the second bus, read direct memory access data from the memory by generating the command data signal based on the direct memory access address signals, and provide the direct memory access data to the direct memory access controller through the second bus.

7. A memory controller comprising:

a main controller configured to store a control data signal received from a processor through a first bus, and control a memory by generating a request data signal based on the control data signal;

a DMA (Direct Memory Access) controller that is connected to a second bus through a third bus, and configured to transmit address signals through the third bus;

a data reading unit separate from the main controller that is connected to the second bus through a fourth bus separate from the first bus, configured to store at least one of read address signals and address signals received from at least one of the processor and at least one IP (Intellectual Property) block through the fourth bus, and read data from the memory by generating a command data signal based on the address signals;

an interface configured to interface at least one of the main controller and the data reading unit with the memory;

a controller configured to generate first selection control signals and a register control signal, output a transmission request signal to the interface in response to at least one of a transmission control signal and a DMA transmission control signal received through the fourth bus and the second bus, and output second selection control signals when a transmission granting signal is received from the interface;

a first multiplexer configured to select at least one of the read address signals and the address signals and output the selected at least one of the read address signals and the address signals in response to the first selection control signals;

an address register configured to store at least one of the read address signals and the address signals received from the first multiplexer, and output the stored address signals in response to the register control signal;

a second multiplexer configured to select at least one of a plurality of command signals and output the selected command signal as a read command signal in response to an external command selection signal; and a third multiplexer configured to select the read command signal and the stored address signals sequentially, and output the read command signal and the stored address signals as the command data signal in response to the second selection control signals.

8. A main controller configured to store a control data signal received from a processor through a first bus, and control a memory by generating a request data signal based on the stored control data signal, the main controller comprising:

a generator configured to generate a transmission recognition signal and register control signals in response to a transmission control signal and a control address signal received through the first bus;

a storage unit configured to store at least one of the control data signal and a request result data signal received from an interface, and output a stored signal in response to the register control signals;

a command decoder configured to output command information by decoding a command signal included in the control data signal;

a controller configured to output a transmission request signal to the interface in response to the transmission recognition signal and the command information and output first selection control signals when a transmission granting signal is received from the interface; and a first multiplexer configured to output the request data signal to the interface based on the stored signal received from the storage unit in response to the first selection control signals.

9. A data reading unit configured to store read address signals received from at least one of a processor and at least one IP block through a first bus, and read data from a memory by generating a command data signal based on the read address signal, the data reading unit comprising:

a controller configured to output a register control signal and a transmission request signal to the interface in response to a transmission control signal received through a second bus, and output first selection control signals when a transmission granting signal is received from the interface, an address register configured to store the read address signals received through the second bus and output the read address signals in response to the register control signal, a first multiplexer configured to select at least one of a plurality of command signals and output the command signal as a read command signal in response to an external command selection signal, and a second multiplexer configured to select the read command signal and the read address signals sequentially, and output the read command signal and the selected read address signal as the command data signal in response to the first selection control signals.

10. An interface configured to receive a transmission request signal from at least one of a main controller and a data reading unit, output a transmission granting signal to at least one of the main controller and the data reading unit, transmit at least one of a request data signal and a command data signal to a memory as a serial output data signal based on first register control signals, and transmit a parallel data signal to at least one of the main controller and the data reading unit as a read data signal in response to a register control signal, wherein the interface comprises:

an entry arbiter configured to receive and output a transmission request signal from at least one of the main controller and the data reading unit and output selection control signals in response to the transmission request signal;

a controller configured to enable a chip selection signal, output the chip selection signal with a memory clock signal to the memory, output a transmission granting signal to at least one of the main controller and the data reading unit through the entry arbiter, and output at least one of first, second and third register control signals in response to the transmission request signal received through the entry arbiter;

a multiplexer configured to select and output at least one of the request data signal and the command data signal in response to the selection control signals;

a register configured to transmit at least one of the request data signal and the command data signal received from the multiplexer to the memory as a serial output data signal in response to the first register control signals, and output a serial input data signal received from the memory as a parallel data signal in response to the second register control signals; and a data register configured to receive the parallel data signal and transmit the parallel data signal to at least one of the main controller and the data reading unit as a read data signal in response to the third register control signal.

11. A pre-fetch unit configured to store data signals received from a memory through an interface after pre-fetching the data signals in response to a pre-fetch start signal, stop the storing of the data signals in response to a pre-fetch stop signal, output a matching signal and a matching data signal to a data reading unit when the matching data signal that corresponds to a read address signal exists among the data signals in response to an address comparison signal, the pre-fetch unit comprising:

- a controller configured to respond to a pre-fetch start signal and output an address buffer control signal, respond to a pre-fetch stop signal and output data buffer control signals, respond to an address comparison signal and output a comparison control signal, respond to a comparison result signal and a first read address signal and output selection control signals, and respond to the comparison result signal and output a matching signal,
- an address buffer configured to respond to the address buffer control signal and stores the first read address signal, and output the first read address signal as a reference address signal,
- a data buffer unit configured to respond to the data buffer control signals and stores read data signals received from the interface,
- an address comparator configured to respond to the reference address signal and calculate an address range of the data buffer, and output the comparison result signal and the first read address signal according to whether or not the first read address signal is included in the address range, and
- a multiplexer configured to respond to the selection control signals and select at least one of the read data signals received from the data buffer, and output the selected read data signal to a data reading unit as a matching data signal.

12. A memory controller comprising:

a main controller configured to store a control data signal received from a processor through a first bus, and control a memory by generating a request data signal based on the stored control data signal;

a data reading unit separate from the main controller, configured to store read address signals received from at least one of the processor and IP (Intellectual Property) blocks through a second bus separate from the first bus, and read data from the memory by generating command data signals based on the read address signals;

an interface configured to interface at least one of the main controller and the data reading unit with the memory;

an entry arbiter configured to receive and output a transmission request signal from at least one of the main controller and the data reading unit, and output selection control signals in response to the transmission request signal;

a controller configured to enable a chip selection signal, output the chip selection signal with a memory clock signal to the memory, output a transmission granting signal to at least one of the main controller and the data reading unit through the entry arbiter, and output a first register control signal, a second register control signal and a third register control signal in response to the transmission request signal received through the entry arbiter;

a multiplexer configured to select and output at least one of the request data signal and the command data signal in response to the selection control signals;

a register configured to transmit at least one of the request data signal and the command data signal received from the multiplexer to the memory as a serial output data signal in response to the first register control signal, and output a serial input data signal received from the memory as a parallel data signal in response to the second register control signal; and a data register configured to receive the parallel data signal and transmit the parallel data signal to at least one of the main controller and the data reading unit as a read data signal in response to the third register control signal.

13. A memory controller comprising:

a main controller configured to store a control data signal received from a processor through a first bus, and control a memory by generating a request data signal based on the control data signal;

a DMA (Direct memory Access) controller that is connected to a second bus through a third bus, and configured to transmit address signals through the third bus;

a data reading unit separate from the main controller that is connected to the second bus through a fourth bus separate from the first bus, configured to store at least one of read address signals and address signals received from at least one of the processor and at least one IP block through the fourth bus, and read data from the memory by generating a command data signal based on the address signals;

an interface configured to interface at least one of the main controller and the data reading unit with the memory; and a pre-fetch unit configured to receive write data signals from the DMA controller and output the write data signals as matching data signals to the data reading unit in response to a mode signal, wherein the DMA controller is configured to transmit the write data signals through the third bus, and the controller of the data reading unit Is configured to generate the mode signal when the address signals are received.

* * * * *